US009565701B2

United States Patent
Quan et al.

(10) Patent No.: US 9,565,701 B2
(45) Date of Patent: Feb. 7, 2017

(54) RANDOM ACCESS RESPONSE RECEIVING AND SENDING METHOD, USER EQUIPMENT, BASE STATION AND SYSTEM

(71) Applicant: Huawei Technologies Co., LTD, Shenzhen (CN)

(72) Inventors: Wei Quan, Beijing (CN); Yuhua Chen, Shenzhen (CN); Jian Zhang, Beijing (CN); Junren Chang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 316 days.

(21) Appl. No.: 14/152,473

(22) Filed: Jan. 10, 2014

(65) Prior Publication Data

US 2014/0126520 A1    May 8, 2014

Related U.S. Application Data

(63) Continuation of application No. PCT/CN2012/078565, filed on Jul. 12, 2012.

(30) Foreign Application Priority Data

Jul. 12, 2011   (CN) .......................... 2011 1 0194549

(51) Int. Cl.
  *H04W 74/08*    (2009.01)
  *H04W 72/04*    (2009.01)
  *H04W 74/00*    (2009.01)

(52) U.S. Cl.
  CPC ....... *H04W 74/0833* (2013.01); *H04W 72/042* (2013.01); *H04W 74/008* (2013.01); *H04W 74/0866* (2013.01)

(58) Field of Classification Search
  CPC .................. H04W 74/0833; H04W 72/042
  See application file for complete search history.

(56) References Cited

U.S. PATENT DOCUMENTS 7,979,769 B2 *  7/2011  Chun .................... H04L 1/1822
                                                    370/474
8,437,335 B2 *  5/2013  Lee ....................... H04L 1/1671
                                                    370/310
(Continued)

FOREIGN PATENT DOCUMENTS

CN    101600197 A    12/2009
CN    101911812 A    12/2010
(Continued)

OTHER PUBLICATIONS

3rd Generation Partnership Project; Technical Specification Group Radio Access Network; Evolved Universal Terrestrial Radio Access (E-UTRA); Medium Access Control (MAC) protocol specification (Release 10), 3GPP TS 36.321 V10.2.0, Jun. 2011, 54 pages.

(Continued)

Primary Examiner — Rasheed Gidado
(74) Attorney, Agent, or Firm — Slater Matsil, LLP

(57) ABSTRACT

Embodiments of the present invention disclose a random access response receiving and sending method, a user equipment, a base station, and a system. The method includes: after sending a dedicated random access preamble to a network side, on a physical downlink control channel, according to a pre-obtained dedicated identifier, detecting control signaling masked by using the dedicated identifier, where the dedicated identifier is a user equipment-specific temporary identifier configured by the network side for the user equipment, and the control signaling includes information about a physical downlink shared channel used to send a random access response and information required for decoding the random access response; and receiving the random access response on a corresponding physical downlink shared channel according to the control signaling.

30 Claims, 8 Drawing Sheets

(56) References Cited

U.S. PATENT DOCUMENTS

| | | | | |
|---|---|---|---|---|
| 8,761,096 B2* | 6/2014 | Chun | .................. | H04W 74/006 |
| | | | | 370/329 |
| 8,831,608 B2* | 9/2014 | Zheng | ............... | H04W 36/0094 |
| | | | | 370/331 |
| 2009/0196261 A1 | 8/2009 | Sambhwani et al. | | |
| 2009/0209248 A1* | 8/2009 | Lee | ..................... | H04W 74/002 |
| | | | | 455/422.1 |
| 2010/0002590 A1* | 1/2010 | Park | ..................... | H04W 74/006 |
| | | | | 370/241 |
| 2010/0246510 A1* | 9/2010 | Ishii | ................... | H04W 74/008 |
| | | | | 370/329 |
| 2010/0296450 A1* | 11/2010 | Faniuolo | ............... | H04W 28/06 |
| | | | | 370/328 |
| 2011/0045837 A1 | 2/2011 | Kim et al. | | |
| 2011/0243075 A1* | 10/2011 | Luo | ..................... | H04W 74/004 |
| | | | | 370/329 |
| 2012/0106460 A1* | 5/2012 | Yang | ....................... | H04L 5/001 |
| | | | | 370/328 |

FOREIGN PATENT DOCUMENTS

| | | |
|---|---|---|
| CN | 101999219 A | 3/2011 |
| EP | 2263341 A0 | 3/2011 |
| WO | 2009027932 A1 | 3/2009 |
| WO | 2009057932 A2 | 5/2009 |
| WO | 2010068011 A2 | 6/2010 |

OTHER PUBLICATIONS

International Search Report and Written Opinion received in Application No. PCT/CN2012/078565 mailed Oct. 18, 2012, 11 pages.
ASUSTek, "Issues of Random Access procedure on SCell," 3GPP TSG-RAN WG2 Meeting #74, R2-112922, Barcelona, Spain May 9-13, 2011, 4 pages.

* cited by examiner

RANDOM ACCESS RESPONSE RECEIVING AND SENDING METHOD, USER EQUIPMENT, BASE STATION AND SYSTEM

This application is a continuation of International Application No. PCT/CN2012/078565, filed on Jul. 12, 2012, which claims priority to Chinese Patent Application No. 201110194549.5, filed on Jul. 12, 2011, both of which are hereby incorporated by reference in their entireties.

TECHNICAL FIELD

Embodiments of the present invention relate to the field of communications technologies and, in particular embodiments, to a random access response receiving and sending method, a user equipment, a base station, and a system.

BACKGROUND

In a long term evolution (LTE) system, a user equipment (UE) may perform a random access procedure to obtain uplink resources required for uplink synchronization and/or communication. When the UE performs random access, the UE sends a random access preamble (RAP) to an eNB. Depending on whether the RAP is UE-specific, the random access procedure breaks down into a non-contention based random access procedure and a contention-based random access procedure. In the non-contention based random access, a dedicated RAP allocated by an eNB to the UE is applied.

In at least the following scenarios, a non-contention based random access procedure may be initiated. One scenario is that downlink data arrives at the eNB side but the UE is out of synchronization in the uplink at this time; and another scenario is that the eNB side instructs the UE to perform cell handover. In a non-contention based random access procedure, the UE sends a dedicated RAP to the eNB; and, if the UE receives a random access response (RAR) sent by the eNB, the UE determines success of the random access. If the UE receives no RAR in a specified time window, the RAP may be sent again immediately or after a period to trigger the whole random access procedure; and such actions are repeated until the random access of the UE succeeds or until a preset maximum random access count is reached which triggers an action other than the random access.

In the prior art, the RAR schedules transmission by using physical downlink control channel (PDCCH) control signaling that is sent in a common search space (CSS) and masked by using a random access radio network temporary identifier (RA-RNTI). Each RA-RNTI corresponds to a PRACH resource. In an LTE system, one PRACH resource is a length that can accommodate a RAP in a time domain, and is a size of six physical resource blocks in a frequency domain. Each PRACH resource can bear multiple RAPs. For example, in a possible implementation manner, an RA-RNTI corresponds to 64 RAPs. Different UEs that send different RAPs on the same PRACH resource use the same RA-RNTI to receive the RAR. Therefore, although different UEs use respective dedicated RAP when initiating a non-random access procedure, the dedicated RAPs may correspond to the same RA-RNTI. In addition, the RA-RNTI is independent of each carrier. That is, the RA-RNTIs used on different carriers may be the same, for example, the RA-RNTI corresponding to the RAP, which is sent by UE 1 on carrier 1, may be the same as the RA-RNTI corresponding to the RAP, which is sent by UE 2 on carrier 2.

For the RAPs sent by multiple UEs on the same carrier, if the RAPs correspond to the same RA-RNTI, multiple RARs in response to the RAPs of the multiple UEs may be set into a medium access control (MAC) protocol data unit (PDU). Therefore, in the same PDCCH transmission scheduling process, the eNB uses an RA-RNTI to mask PDCCH control signaling to schedule transmission of an RAR. The UE uses the RA-RNTI to perform blind detection for the PDCCH control signaling, and receives the RAR from the PDSCH indicated by the control signaling. If the correctly received RAR carries an identifier compliant with the UE-specific RAP, it indicates that the RAR is an RAR sent to the UE. Otherwise, it indicates that the RAR is not an RAR sent to the UE. Before an RAR receiving timer times out, the UE continues the blind detection of the control signaling masked by using the RA-RNTI and the corresponding RAR until the RAR sent to the UE is received successfully. If the RAR receiving timer times out and the UE has not successfully received the RAR sent to the UE, the UE sends a dedicated RAP to the eNB again, and the foregoing procedure is repeated. Therefore, it can be seen that the complexity for a UE to receive a random access response is high in the prior art.

SUMMARY OF THE INVENTION

Embodiments of the present invention provide a random access response receiving and sending method, a user equipment, a base station and a system to reduce the complexity for a user equipment to receive a random access response.

An embodiment of the present invention provides a random access response receiving method. After sending a dedicated random access preamble to a network side, on a physical downlink control channel, according to a pre-obtained dedicated identifier, control signaling masked is detected by using the dedicated identifier. The dedicated identifier is a user equipment-specific temporary identifier configured by the network side for the user equipment. The control signaling includes information about a physical downlink shared channel used to send a random access response and information required for decoding the random access response. The random access response is received on a corresponding physical downlink shared channel according to the control signaling.

An embodiment of the present invention further provides a random access response sending method. A random access response is generated after receiving a dedicated random access preamble sent by a user equipment. Control signaling is masked according to a dedicated identifier. The dedicated identifier is a user equipment-specific temporary identifier configured by a network side for the user equipment. The control signaling includes information about a physical downlink shared channel used to send a random access response and information required for decoding the random access response. The masked control signaling is sent on a physical downlink control channel and the random access response is sent on a corresponding physical downlink shared channel according to the control signaling.

An embodiment of the present invention further provides a user equipment. A control signaling detecting module is configured to, after a dedicated random access preamble is sent to a network side, on a physical downlink control channel, according to a pre-obtained dedicated identifier, detect control signaling masked by using the dedicated identifier. The dedicated identifier is a user equipment-specific temporary identifier configured by the network side for the user equipment. The control signaling includes information about a physical downlink shared channel used to send a random access response and information required for decoding the random access response. A random access response receiving module is configured to receive the random access response on a corresponding physical downlink shared channel according to the control signaling.

An embodiment of the present invention further provides a base station. A random access response generating module, configured to generate a random access response after receiving a dedicated random access preamble sent by a user equipment. A control signaling masking module is configured to mask control signaling according to a dedicated identifier. The dedicated identifier is a user equipment-specific temporary identifier configured by a network side for the user equipment. The control signaling includes information about a physical downlink shared channel used to send a random access response and information required for decoding the random access response. A random access response sending module is configured to send the masked control signaling on a physical downlink control channel and to send the random access response on a corresponding physical downlink shared channel according to the control signaling.

An embodiment of the present invention further provides a communication system, including the user equipment and the base station.

In the random access response receiving and sending method, the user equipment, the base station, and the system provided in the embodiments of the present invention, a network side uses a dedicated identifier to mask control signaling used to indicate receiving of an RAR, and therefore, according to a detection result of the control signaling, the UE can determine whether the current control signaling is sent by the network side to the UE, and receives the RAR according to the control signaling only when the control signaling is detected correctly, thereby reducing the complexity for the UE to receive the RAR and reducing the probability for the UE to incorrectly apply a timing advance carried in the RAR.

DETAILED DESCRIPTION OF ILLUSTRATIVE EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

The sequence numbers of the following embodiments of the present invention are merely for description purpose, but do not indicate the preference of the embodiments.

Figure 1:
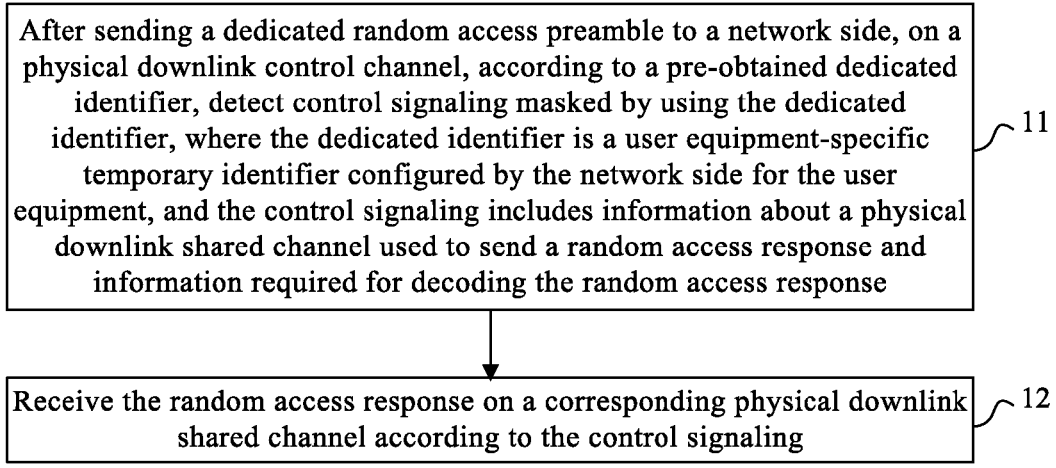
FIG. 1 is a flowchart of a random access response receiving method according to Embodiment 1 of the present invention.

FIG. 1 is a flowchart of a random access response receiving method according to Embodiment 1 of the present invention. The entity for executing this embodiment may be a user equipment, that is, a UE. The method shown in FIG. 1 includes the following steps.

Step 11: After sending a dedicated random access preamble to a network side, on a physical downlink control channel, according to a pre-obtained dedicated identifier, detect control signaling masked by using the dedicated identifier, where the dedicated identifier is a user equipment-specific temporary identifier configured by the network side for the user equipment, and the control signaling includes information about a physical downlink shared channel used to send a random access response and information required for decoding the random access response.

The UE sends a dedicated random access preamble to the network side to initiate a non-contention based random access procedure.

The dedicated identifier used to mask and demask the control signaling is configured by the network side for the UE, and is notified to the UE before the UE initiates the non-contention based random access procedure. The dedicated identifier may be, but without being limited to: a cell radio network temporary identifier (C-RNTI for short), or a dedicated random access radio network temporary identifier (a dedicated RA-RNTI for short) configured by the network side for the user equipment. The control signaling includes: a physical resource required for receiving the random access response, for example, information about a physical downlink shared channel used to send a random access response; and the control signaling may further include information required for decoding the random access response, for example, a corresponding modulation coding scheme for decoding the random access response.

For example, the UE may detect the control signaling on the network-side PDCCH in the following procedure. The UE uses the dedicated identifier to monitor the PDCCH that is possibly to be used to send the control signaling on the network side. If the dedicated identifier can be used to demask the control signaling on the PDCCH correctly, it indicates that the demasked control signaling is sent by the network side to the UE, and the UE receives the RAR according to the demasked control signaling. Otherwise, it indicates that the control signaling on the PDCCH is not destined for the UE.

Step 12: Receive the random access response on a corresponding physical downlink shared channel according to the control signaling.

The random access response may include a timing advance required for uplink synchronization between the UE and the network side, and may further include uplink resources allocated by the network side to the UE and required for communication between the UE and the network side, power adjustment information, and so on.

For example, the UE may receive an RAR in the following procedure. On the PDSCH to which the control signaling is directed, the UE decodes the RAR according to the detected control signaling and information required for decoding the RAR, where the information is carried in the control signaling. If the UE finds the RAR on the PDSCH and the RAR is decoded successfully, it indicates that the UE receives the RAR correctly; otherwise, it indicates that the UE fails to receive the RAR correctly.

The foregoing technical solution is applicable to a single-carrier scenario or a carrier aggregation (CA for short) scenario or other application scenarios. In a single-carrier application scenario, the network side configures a carrier for the UE, and a cell that includes the carrier is a serving cell of the UE. In a carrier aggregation application scenario, to improve the peak rate of the UE, the network side such as an eNB configures multiple carriers for the UE. Any one carrier allocated to the UE is called a component carrier (CC for short), and a cell that includes each CC is called a serving cell of the UE. In multiple component carriers configured for the UE, one component carrier acts as a primary component carrier (PCC), and a serving cell where the PCC is located is called a primary cell (PCell for short), other component carriers act as secondary component carriers (SCC for short), and the serving cell where the SCC is located is called a secondary cell (SCell for short).

On the basis of the foregoing technical solution, optionally, before the UE sends the dedicated random access preamble to the network side, the RAR receiving method may further include: receiving random access indication information, and sending the dedicated random access preamble to the network side on the corresponding physical random access channel according to the random access indication information. The random access indication information includes the dedicated random access preamble, a physical random access channel (PRACH for short) configured for random access of the user equipment, where the PRACH is located in a single serving cell configured by the network side for the UE or located in a primary serving cell or any one secondary serving cell in multiple serving cells configured by the network side for the UE.

In the process of implementing the embodiment of the present invention, the inventor finds that in a non-contention based random access procedure, the network side in the prior art uses an RA-RATI to mask the control signaling used to indicate receiving of an RAR, and the UE uses an RA-RNTI to detect the control signaling on the PDCCH. As analyzed in the BACKGROUND herein, the dedicated RAPs used by different UEs may correspond to the same RA-RNTIs, the same RA-RNTI may be used on different carriers, and one RA-RNTI may be used to transmit the RAR of multiple UEs. Therefore, the UE determines whether the RAR is sent by the network side to the UE only if the control signaling masked by using the RA-RNTI is detected and the RAR is received correctly according to the control signaling. That is, according to the content in the correctly obtained RAR, the UE determines whether the RAR is sent by the network side to the UE, which leads to high complexity for the UE to receive the RAR.

In the process of implementing the embodiment of the present invention, the inventor further finds that when a UE performs non-contention based random access on a secondary serving cell in a carrier aggregation application scenario, the eNB in the prior art sends control signaling on a PDCCH located in a common search space of the primary serving cell to schedule the RAR of the UE, where the control signaling is masked by using the RA-RNTI, which may make the UE fail to tell whether the corresponding RAR belongs to the UE, and therefore lead to incorrect application. For example, UE 1 and UE 2 use the same primary serving cell, and UE 1 and UE 2 send the same RAP on their own secondary serving cell respectively; or UE 1 sends a RAP on the primary serving cell and UE 2 sends the same RAP on the secondary serving cell. In this case, the RAPs used by UE 1 and UE 2 correspond to the same RA-RNTI, and the eNB needs to send the RAR of UE 1 and UE 2 on the primary serving cell. According to the prior art, UE 1 and UE 2 are confused and fail to tell whether the RAR belongs to UE 1 and UE 2, which may lead to incorrect application. For example, the UE may apply the timing advance in the RAR that is not destined for the UE, which leads to communication errors. In another example, UE 1 is in a carrier aggregation state, UE 2 is in a single-carrier state, and the primary serving cell of UE 1 is the same as the serving cell of UE2, and therefore, the eNB needs to send the RARs of UE 1 and UE 2 on the primary serving cell of UE 1 and the serving cell of UE 2, that is, on the same serving cell. In this case, the UE may apply the RAR incorrectly.

In this embodiment, however, the control signaling sent by the network side to the UE to indicate receiving of the RAR is masked by a UE-specific identifier configured by the network side for the UE. The UE uses the dedicated identifier to perform blind detection for the control signaling on the PDCCH. If the control signaling is detected on the PDCCH by using the dedicated identifier, it indicates that the control signaling is destined for the UE, and the UE receives the RAR on the corresponding PDSCH according to the control signaling; otherwise, it indicates that the control signaling is not destined for the UE. Therefore, it can be seen that in this embodiment, a dedicated identifier is used to mask the control signaling that is used to indicate receiving of an RAR, and therefore, according to a detection result of control signaling, the UE can determine whether the current control signaling is sent by the network side to the UE, and receives the RAR according to the control signaling only if the control signaling is detected correctly, thereby reducing the complexity for the UE to receive the RAR and preventing the UE from incorrectly applying the timing advance carried in the RAR.

In the process of implementing the embodiment of the present invention, the inventor further finds that in a carrier aggregation application scenario, the prior art supports only intra-band carrier aggregation. In this case, the same timing advance is used in the uplink of multiple serving cells configured for the UE, and the random access procedure intended to regain uplink synchronization after uplink synchronization loss of the UE occurs only on the primary serving cell, that is, the PDCCH and the PDSCH used by the random access preamble and the random access response all need to be transmitted on the primary serving cell, and other secondary serving cells apply the timing advance obtained after the random access is performed based on the primary serving cell.

With the continuous development of communication technologies, a UE has an application requirement of supporting inter-band carrier aggregation. However, inter-band carriers may travel along different transmission paths. For example, a certain carrier or certain carriers pass through the same repeater or different repeaters, and another carrier or other carriers do not pass through a repeater. In addition, even if no carrier passes through the repeater or all carriers pass through the same repeater, multiple inter-band carriers may have different transmission features, and therefore, multiple serving cells configured for the UE may be incapable of using the same timing advance. The timing advance obtained through only random access in the primary serving cell is not applicable on the secondary serving cell, and random access needs to be performed on a certain secondary serving cell or certain secondary serving cells separately to obtain the corresponding timing advance, and no corresponding solution is available in the prior art.

In the RAR receiving method provided in the embodiment of the present invention, the RAR includes a timing advance. If the PRACH used by the UE to send a RAP is located in any one secondary serving cell among multiple serving cells configured by the network side for the UE, the method may further include applying the timing advance onto an uplink channel that needs to perform communication in the any one secondary serving cell, so that the user equipment performs uplink synchronization with the network side in the any one secondary serving cell. Therefore, it can be seen that, the UE in the embodiment of the present invention can perform non-contention based random access in any one secondary serving cell to obtain the timing advance corresponding to the secondary serving cell, and therefore, the UE can apply the timing advance corresponding to the secondary serving cell in the secondary serving cell in an application scenario where the UE needs to support inter-band carrier aggregation, so that the UE performs uplink synchronization with the network side in the secondary serving cell.

Further, after the UE receives the RAR on the corresponding PDSCH according to the detected control signaling, the RAR receiving method provided in the embodiment of the present invention may further include: according to a result of receiving the RAR, sending feedback information to the network side on a physical uplink channel configured by the network side for the UE. For example, the feedback information is ACK information which is used to indicate that the UE has received the RAR correctly; or, the feedback information is NACK information which is used to indicate that the UE has not received the RAR correctly.

If the channel used to send the RAP is located in a secondary serving cell among multiple serving cells configured for the user equipment, the uplink physical channel used to send the feedback information includes a physical uplink control channel (PUCCH for short) or a physical uplink shared channel (PUSCH for short) of a primary serving cell among the multiple serving cells configured for the user equipment, or, the physical uplink channel includes a PUSCH of a secondary serving cell among the multiple serving cells configured for the UE; and/or, if the channel used to send the RAP is located in a single serving cell configured for the UE or a primary serving cell among multiple serving cells configured for the UE, the uplink physical channel used to send the feedback information is a PUCCH preconfigured for the UE for a purpose of feedback.

If the UE is in an uplink synchronization state in a serving cell where the physical uplink channel is located, the UE sends the feedback information to the network side over the physical uplink channel at a fourth subframe after the control signaling is detected, where the feedback information includes ACK information or NACK information; and/or, if the UE is in an uplink synchronization loss state in the serving cell where the physical uplink channel is located and the RAR is received correctly, the UE applies the timing advance onto the physical uplink channel at a sixth subframe after the control signaling is detected, and sends the feedback information to the network side, where the feedback information includes the ACK information. The fourth subframe and the sixth subframe are preferred times of sending the feedback information, so that the time of sending feedback in the existing communication system can be reused. Understandably, the time of sending the feedback information may also be set to another value.

The UE send no feedback information to the network side if the user equipment is in an uplink synchronization loss state in the serving cell where the physical uplink channel is located and the random access response is not received correctly.

In the above technical solution, the UE may start a random access response receiving timer (that is, a random access response receiving window is started) after sending the dedicated RAP and before detecting the control signaling, where the random access response receiving timer is configured to limit time of the action of the UE for receiving the RAR.

If the UE detects the control signaling in a timing range of the random access response receiving timer and receives the RAR correctly, the UE finishes the non-contention based random access procedure; and, in the subsequent uplink communication process, the UE may apply the timing advance carried in the RAR that is received correctly in the non-contention based random access procedure.

Therefore, it can be seen that, an RAR retransmission mechanism is introduced in the non-contention based random access procedure in the embodiment of the present invention to improve the reliability of RAR transmission. In addition, the random access delay possibly caused by the RAR-based retransmission mechanism is smaller than the random access delay possibly caused by re-initiation of the entire random access procedure, and therefore, the embodiment of the present invention is good for reducing the delay caused by the reliability of RAR transmission. Further, because the resource overhead required for retransmitting the RAR is smaller than the resource overhead required for finishing the entire random access procedure, the embodiment of the present invention is good for reducing the resource overhead required by random access of the UE.

Figure 2:
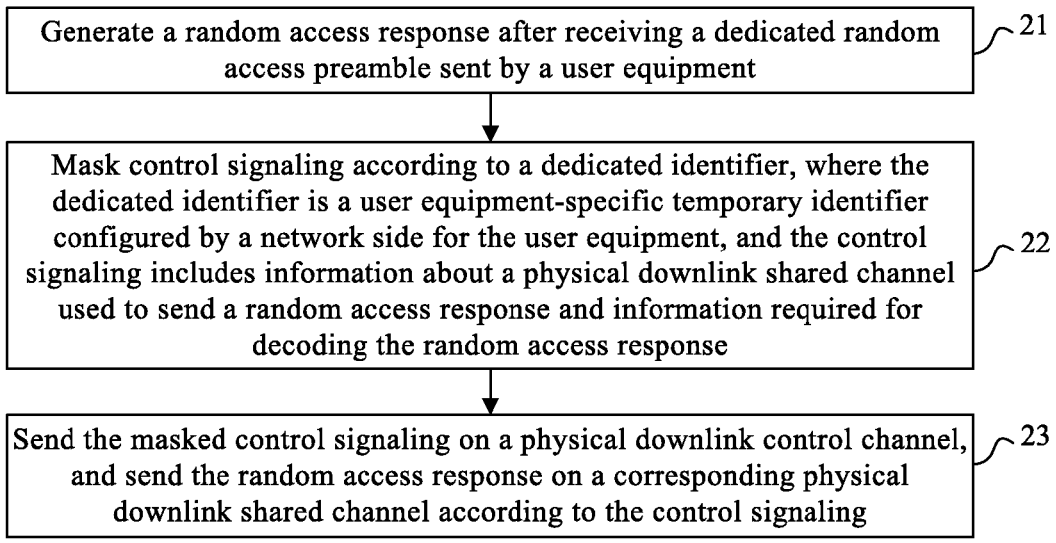
FIG. 2 is a flowchart of a random access response receiving method according to Embodiment 2 of the present invention.

FIG. 2 is a flowchart of a random access response receiving method according to Embodiment 2 of the present invention. The entity for executing this embodiment may be a network-side device such as an eNB. The method shown in FIG. 2 includes the following steps.

Step 21: Generate a random access response after receiving a dedicated random access preamble sent by a user equipment.

The UE sends a dedicated RAP to the eNB to initiate a non-contention based random access procedure. The eNB may generate an RAR after receiving the RAP sent by the UE. The RAR may include a timing advance required for uplink synchronization between the UE and a network side, and may further include uplink resources configured by the network side for the UE and required for communication between the UE and the network side, power adjustment information, and so on.

Step 22: Mask control signaling according to a dedicated identifier, where the dedicated identifier is a user equipment-specific temporary identifier configured by a network side for the user equipment, and the control signaling includes information about a physical downlink shared channel used to send a random access response and information required for decoding the random access response.

The dedicated identifier used to mask or demask the control signaling is configured by the eNB for the UE, and is notified to the UE before the UE initiates the non-contention based random access procedure. The dedicated identifier may be, but without being limited to, a C-RNTI or a dedicated RA-RNTI. The control signaling includes: a physical resource required for receiving the random access response, for example, information about a physical downlink shared channel used to send a random access response; and the control signaling may further include information required for decoding the random access response, for example, a corresponding modulation coding scheme for decoding the random access response.

Step 23: Send the masked control signaling on a physical downlink control channel, and send the random access response on a corresponding physical downlink shared channel according to the control signaling.

In this embodiment, a dedicated identifier of the UE, which is configured by the network side for the UE, is used to mask the control signaling that is sent by the network side to the UE and used to indicate receiving of an RAR, and therefore, the UE uses the dedicated identifier to perform blind detection for the control signaling on the PDCCH, so that the UE can determine, according to a detection result of the control signaling, whether the current control signaling is sent by the network side to the UE, and receives the RAR according to the control signaling only if the control signaling is detected correctly, thereby reducing the complexity for the UE to receive the RAR and preventing the UE from incorrectly applying the timing advance carried in the RAR.

The foregoing technical solution is applicable to a single-carrier scenario or a carrier aggregation scenario or other application scenarios. In a single-carrier application scenario, the PDCCH used by the eNB to send the control signaling is located in a single serving cell of the UE; and the sent control signaling is located in a dedicated search space or a common search space of the PDCCH used to send the control signaling. In a carrier aggregation application scenario, the PDCCH used by the eNB to send the control signaling may be located in any one serving cell among multiple serving cells configured by the eNB for the UE, and the sent control signaling is located in a dedicated search space of the PDCCH used to send the control signaling; or, the PDCCH used by the eNB to send the control signaling may be located in a primary serving cell among the multiple serving cells configured by the eNB for the UE, and the sent control signaling is located in a common search space of the PDCCH used to send the control signaling.

On the basis of the foregoing technical solution, optionally, before the eNB generates the RAR, the RAR sending method may further include: sending, by the eNB, random access indication information to the UE, where the random access indication information includes the dedicated RAP and a PRACH configured for random access of the UE, where the PRACH may be located in a single serving cell configured for the user equipment or located in a primary serving cell or any one secondary serving cell in multiple serving cells configured for the UE. On the PRACH to which the random access indication information is directed, the eNB receives the dedicated RAP sent by the UE; and determines the timing advance required for uplink synchronization between the UE and the eNB in the serving cell where the PRACH used to send the dedicated RAP is located.

Therefore, it can be seen that, the eNB in the embodiment of the present invention may instruct the UE to perform non-contention based random access in any one secondary serving cell of the UE, and indicate the timing advance to be applied by the UE in the secondary serving cell, and therefore, the UE can apply the timing advance corresponding to the secondary serving cell in the secondary serving cell in an application scenario where the UE needs to support inter-band carrier aggregation, so that the UE performs uplink synchronization with the network side in the secondary serving cell.

Figure 3A:
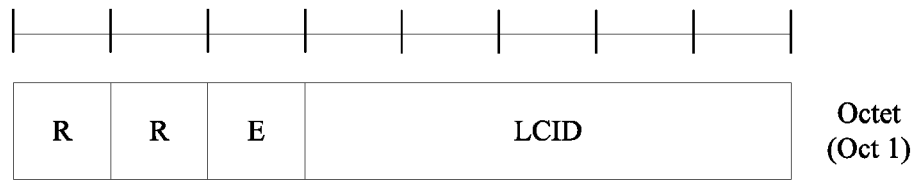
FIG. 3a is an example of a sub-header format of an RAR according to an embodiment of the present invention.

The RAR generated by the eNB may be a media access control element (Media Access Control Element, MAC CE for short) that includes at least timing advance information, where the MAC CE may be multiplexed with other MAC CEs or data packets and transmitted on the PDSCH. The specific format of the RAR is not restricted. For example, the eNB may allocate an independent logical channel identifier (Logical Channel Identity, LCID for short) to an MAC CE that includes an RAR. A sub-header (Sub-header) format of the RAR is as shown in FIG. 3*a*. In an octet (Oct1) included in the sub-header format shown in FIG. 3*a*, LCID represents a logical channel identifier, and occupies 5 bits; R represents a reserved bit (Reserve) and occupies 2 bits; E represents an extension bit (Extension) and is used to indicate whether another MAC sub-header exists behind the MAC sub-header. For example, "1" means that another MAC sub-header exists behind, and "0" means that no another MAC sub-header exists behind. The extension bit occupies 1 bit.

Figure 3B:
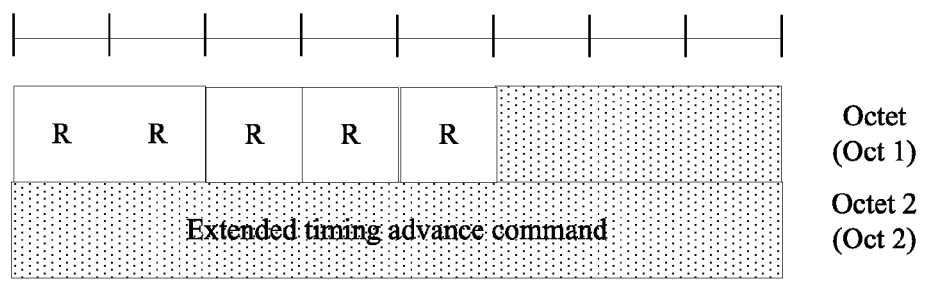
FIG. 3b is Example 1 of a content format of an RAR according to an embodiment of the present invention.

A possible content format of the RAR may be as shown in FIG. 3*b*. The content format shown in FIG. 3*b* includes two octets (Oct1 and Oct2), 11 bits of which are occupied by an extended timing advance command (Extended Timing Advance Command) to carry the timing advance determined by the eNB.

Figure 3C:
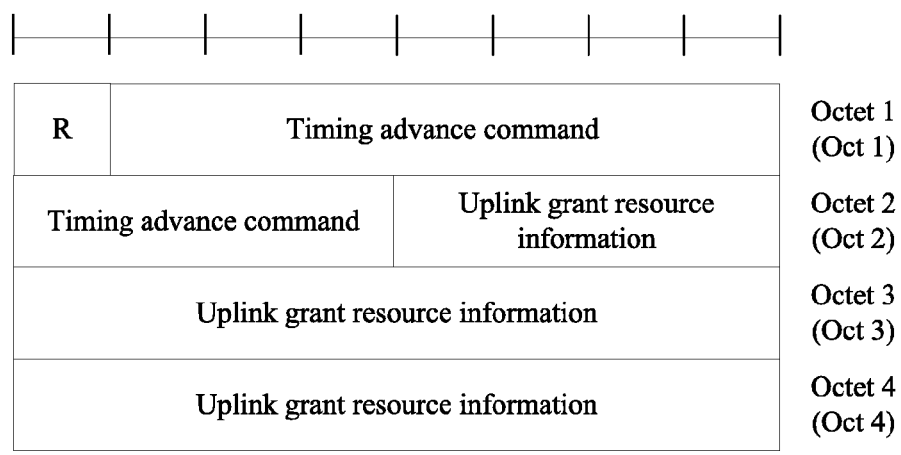
FIG. 3c is Example 2 of a content format of an RAR according to an embodiment of the present invention.

Another possible content format of the RAR may be as shown in FIG. 3*c*. The content format shown in FIG. 3*c* includes four octets (Oct1 to Oct4), 11 bits of Oct1 and Oct2 are occupied by a timing advance command to carry the timing advance determined by the eNB; and uplink grant (UL Grant) resource information configured by the eNB for the UE and available for UE communication may be carried in corresponding bits in Oct2, Oct3, and Oct4, so as to notify the uplink resource information to the UE.

Figure 3D:
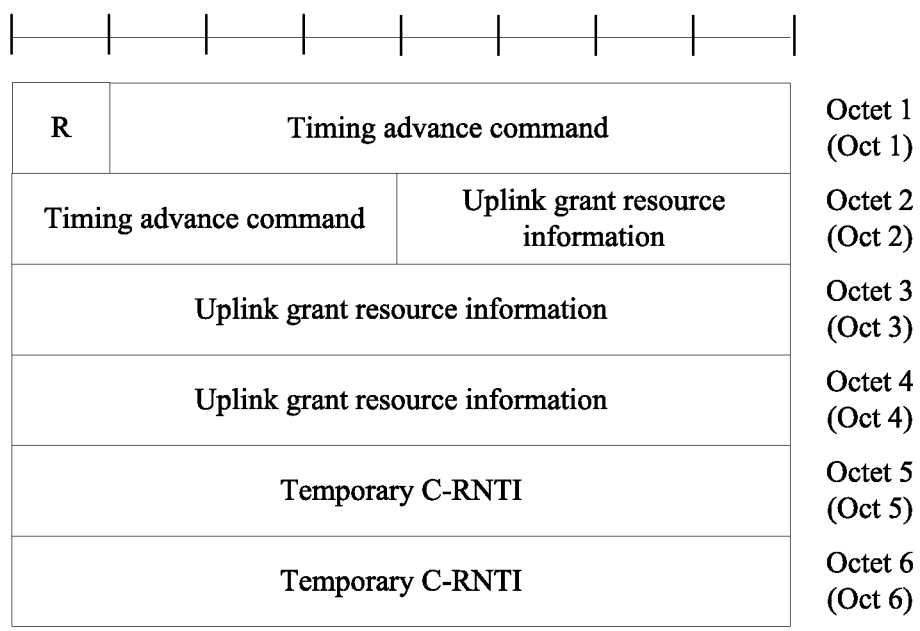
FIG. 3d is Example 3 of a content format of an RAR according to an embodiment of the present invention.

Another possible content format of the RAR may be as shown in FIG. 3*d*. Differences from the format shown in FIG. 3*c* are: The content format shown in FIG. 3*d* includes six octets (Oct1-Oct6), and Oct5 and Oct6 may be used to carry temporary C-RNTI information allocated by the eNB to the UE.

It should be noted that the RAR format is only an application example in the embodiment of the present invention and shall not be construed as a limitation on the essence of the technical solution provided in the embodiment of the present invention.

In a carrier aggregation scenario of the foregoing technical solution, optionally, the PDCCH used by the eNB to send the control signaling, the PDSCH used to send the RAR, and the channel such as PRACH used to receive the dedicated RAP, are respectively located in different serving cells configured for the UE. Alternatively, at least any two of the PDCCH used by the eNB to send the control signaling, the PDSCH used to send the RAR, and the channel such as PRACH used to receive the dedicated RAP are located in the same serving cell configured for the user equipment. For example, the eNB receives the dedicated RAP sent by the UE on the PRACH of the primary serving cell of the UE, sends the control signaling on the PDCCH of the primary serving cell of the UE, and sends the RAR on the PDSCH of the secondary serving cell of the UE; or the eNB receives the dedicated RAP sent by the UE on the PRACH of the primary serving cell of the UE, sends the control signaling on the PDCCH of the primary serving cell of the UE, and sends the RAR on the PDSCH of the primary serving cell of the UE; and so on.

Optionally, after the control signaling and the RAR are sent, the RAR sending method provided in the embodiment of the present invention may further include: receiving, by the eNB, feedback information on the physical uplink channel, where the feedback information is sent by the UE according to a result of receiving the RAR.

If the channel such as PRACH used by the eNB to receive the dedicated RAP belongs to a secondary serving cell among multiple serving cells configured by the eNB for the UE, the physical uplink channel used by the eNB to receive the feedback information may include a PUCCH or a PUSCH of the primary serving cell among multiple serving cells configured for the UE; or the physical uplink channel includes a PUSCH of a secondary serving cell among the multiple serving cells configured for the UE; and/or, if the channel such as PRACH used by the eNB to receive the dedicated RAP is located in a single serving cell configured for the UE or a primary serving cell among multiple serving cells configured for the UE, the physical uplink channel used by the eNB to receive the feedback information is a PUCCH preconfigured for the UE for a purpose of feedback.

If the UE is in an uplink synchronization state in a serving cell where the physical uplink channel is located, the feedback information is received on the physical uplink channel at a fourth subframe after the control signaling is sent, where the feedback information includes ACK information or NACK information; and/or, if the UE is in an uplink synchronization loss state in a serving cell where the physical uplink channel is located, the timing advance is applied and the feedback information is received on the physical uplink channel at a sixth subframe after the control signaling is sent, where the feedback information includes ACK information. The fourth subframe and the sixth subframe are preferred times of sending the feedback information, so that the time of sending feedback in the existing communication system can be reused and compatible. Understandably, the time of sending the feedback information may also be set to another value.

If the feedback information received by the eNB is NACK information, the eNB retransmits the control signaling on the PDCCH, and sends the RAR on the corresponding PDSCH according to the control signaling. The serving cell where the PDCCH used by the eNB to initially send the control signaling is located may be the same as the serving cell where the PDCCH used to retransmit the control signaling is located; if the eNB enables a cross scheduling function for the UE, the serving cell where the PDCCH used by the eNB to initially send the control signaling is located may be different from the serving cell where the PDCCH used to retransmit the control signaling is located. The serving cell where the PDSCH used by the eNB to initially send the RAR is located is the same as the serving cell where the PDSCH used by the eNB to retransmit the RAR is located, so that the UE can combine and receive the RARs that are sent by the eNB repeatedly.

Optionally, the feedback information includes ACK information. The RAR sending method provided in the embodiment of the present invention may further include: after the eNB sends the RAR, retransmitting, by the eNB, the control signaling on the PDCCH and retransmitting the RAR on the corresponding PDSCH according to the control signaling if the ACK information is not received at the predetermined time of receiving and sending the feedback information. The time of receiving and sending the feedback information is the time of the UE sending the feedback information and the time of the eNB receiving the feedback information. Generally, the time of the UE sending the feedback information is the same as the time of the eNB receiving the feedback information.

Therefore, it can be seen that, an RAR retransmission mechanism is introduced in the non-contention based random access procedure in the embodiment of the present invention to improve the reliability of RAR transmission; in addition, the random access delay possibly caused by the RAR-based retransmission mechanism is smaller than the random access delay possibly caused by re-initiation of the entire random access procedure, and therefore, the embodiment of the present invention is good for reducing the delay caused by the reliability of RAR transmission; and further, because the resource overhead required for retransmitting the RAR is smaller than the resource overhead required for finishing the entire random access procedure, the embodiment of the present invention is good for reducing the resource overhead required by random access of the UE.

Figure 4:
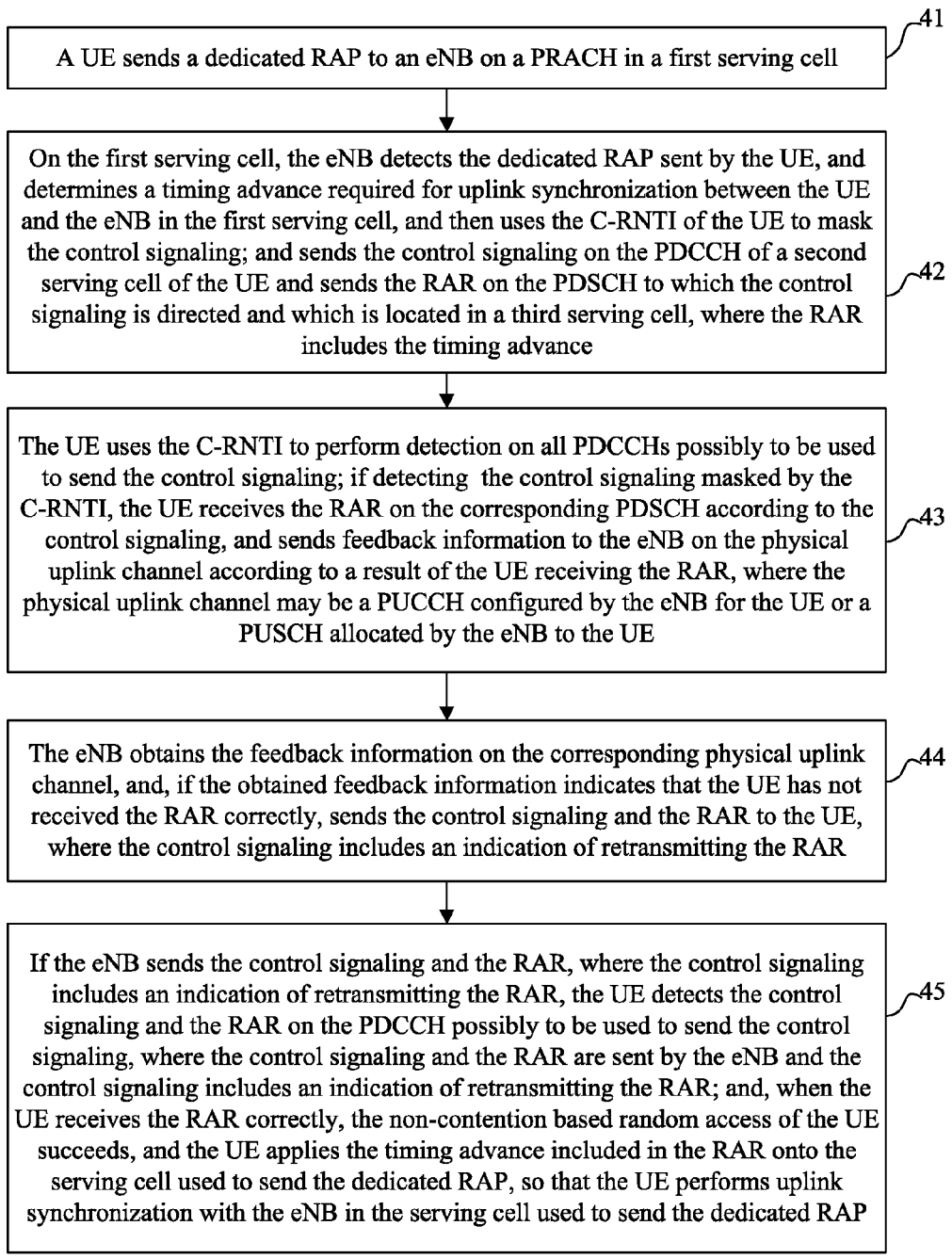
FIG. 4 is a flowchart of an RAR sending and receiving method according to Embodiment 3 of the present invention.

FIG. 4 is a flowchart of an RAR sending and receiving method according to Embodiment 3 of the present invention. This embodiment describes the technical solution provided in the embodiment of the present invention from the perspective of the UE and the eNB. In this embodiment, a dedicated identifier used to mask or demask control signaling is a C-RNTI. As shown in FIG. 4, the method provided in this embodiment includes the following steps:

Step 41: A UE sends a dedicated RAP to an eNB on a PRACH in a first serving cell.

In a single-carrier application scenario, the first serving cell is a single serving cell configured by the eNB for the UE.

In a multi-carrier application scenario, the first serving cell is any one serving cell among multiple serving cells configured by the eNB for the UE, for example, a primary serving cell or any one secondary serving cell. The specific serving cell in which the UE initiates non-contention based random access, that is, the first serving cell, may be notified by the eNB to the UE by means of random access indication information before the UE sends the dedicated RAP, where the random access indication information may include a PRACH resource used to send the dedicated RAP, and information on a serving cell where the PRACH resource is located; and, in the corresponding serving cell indicated by the random access indication information, on the corresponding PRACH resource indicated by the random access indication information, the UE sends the dedicated RAP indicated by the random access indication information.

Step 42: On the first serving cell, the eNB detects the dedicated RAP sent by the UE, and determines a timing advance required for uplink synchronization between the UE and the eNB in the first serving cell, and then uses the C-RNTI of the UE to mask the control signaling; and sends the control signaling on the PDCCH of a second serving cell of the UE and sends the RAR on the PDSCH to which the control signaling is directed and which is located in a third serving cell, where the RAR includes the timing advance.

In a single-carrier application scenario, the second serving cell, the third serving cell, and the first serving cell are the same serving cell, that is, the single serving cell configured by the eNB for the UE. In this case, the serving cell where the PRACH used by the UE to send the dedicated RAP is located, the serving cell where the PDCCH used by the eNB to send the control signaling is located, and the serving cell where the PDSCH used by the eNB to send the RAR is located are the same.

In a carrier aggregation application scenario, the second serving cell may be a primary serving cell or any one secondary serving cell among multiple serving cells configured by the eNB for the UE, and the third serving cell may be a primary serving cell or any one secondary serving cell among the multiple serving cells configured by the eNB for the UE. The first serving cell, the second serving cell, and the third serving cell may be the same serving cell; or two of the first serving cell, the second serving cell, and the third serving cell are the same; or, the first serving cell, the second serving cell, and the third serving cell are different from each other.

When the second serving cell is a primary serving cell configured by the eNB for the UE, the control signaling masked by using the C-RNTI may be sent in a dedicated search space or a common search space of the PDCCH in the second serving cell; or, when the second serving cell is any one secondary serving cell configured by the eNB for the UE, the control signaling masked by using the C-RNTI may be sent in a dedicated search space of the PDCCH in the second serving cell.

The message format of the RAR sent by the eNB to the UE is not limited. For examples of the RAR format, reference may be made to the corresponding description in embodiments corresponding to FIG. 3a to FIG. 3d, and no repeated description is given here any further.

Step 43: The UE uses the C-RNTI to perform detection on all PDCCHs possibly to be used to send the control signaling; if detecting the control signaling masked by the C-RNTI, the UE receives the RAR on the corresponding PDSCH according to the control signaling, and sends feedback information to the eNB on the physical uplink channel according to a result of the UE receiving the RAR, where the physical uplink channel may be a PUCCH configured by the eNB for the UE or a PUSCH allocated by the eNB to the UE.

For example, the feedback information is ACK information which is used to indicate that the UE has received the RAR correctly; or, the feedback information is NACK information which is used to indicate that the UE has not received the RAR correctly. If the UE has not received the RAR correctly, by sending no feedback information to the eNB, the UE may notify the eNB that the UE has not received the RAR correctly. For the specific implementation manner of the UE sending feedback information to the eNB, reference may be made to the corresponding description in the embodiment corresponding to FIG. 1, and no repeated description is given here any further.

Step 44: The eNB obtains the feedback information on the corresponding physical uplink channel, and, if the obtained feedback information indicates that the UE has not received the RAR correctly, sends the control signaling and the RAR to the UE, where the control signaling includes an indication of retransmitting the RAR.

For the specific implementation manner regarding how the eNB obtains the feedback information of the UE and how the eNB sends the control signaling and the RAR to the UE, where the control signaling includes an indication of retransmitting the RAR, reference may be made to the embodiment corresponding to FIG. 2, and no repeated description is given here any further.

Step 45: If the eNB sends the control signaling and the RAR, where the control signaling includes an indication of retransmitting the RAR, the UE detects the control signaling and the RAR on the PDCCH possibly to be used to send the control signaling, where the control signaling and the RAR are sent by the eNB and the control signaling includes an indication of retransmitting the RAR; and, when the UE receives the RAR correctly, the non-contention based random access of the UE succeeds, and the UE applies the timing advance included in the RAR onto the serving cell used to send the dedicated RAP, so that the UE performs uplink synchronization with the eNB in the serving cell used to send the dedicated RAP.

For the specific implementation manner regarding how the UE receives the control signaling and the RAR from the eNB, where the control signaling includes an indication of retransmitting the RAR, reference may be made to the corresponding description in the embodiment corresponding to FIG. 1, and no repeated description is given here any further.

In the case where the control signaling is masked and demasked by using a C-RNTI in this embodiment, optionally, the UE may start a random access response receiving timer (that is, a random access response receiving window is started) after sending the dedicated random access preamble and before detecting the control signaling.

If the UE fails to receive the RAR correctly upon timeout of the random access response receiving timer, step 41 may be performed, that is, the UE retransmits the dedicated RAP to the eNB to trigger the entire non-contention based random access procedure again. If the UE receives the RAR correctly in the process of getting ready for retransmitting the dedicated RAP to the network side, the UE terminates the retransmission of the RAP.

In this embodiment, the UE-specific C-RNTI configured by the eNB for the UE is applied to an RAR receiving and sending process in non-contention based random access of the UE, and therefore, according to a detection result of control signaling, the UE can determine whether the RAR related to the control signaling is sent by the eNB to the UE, and receives the RAR according to the control signaling only if the control signaling is detected correctly, thereby reducing the complexity for the UE to receive the RAR and preventing the UE from incorrectly applying the timing advance carried in the RAR. To avoid affecting the existing communication procedure based on the C-RNTI, in this embodiment, the UE needs to detect the C-RNTI-masked control signaling on the PDCCH no matter whether the UE has received the RAR correctly in the time range of the random access response receiving timer and/or the random access response retransmission receiving timer, so as to prevent the UE from omitting detection of other C-RNTI-masked control signaling sent by the eNB to the UE and prevent impact on normal communication between the UE and the eNB.

In a carrier aggregation application scenario, the eNB may instruct the UE to initiate non-contention based random access in any one secondary serving cell of the UE, and, through the non-contention based random access procedure, notify the UE of the timing advance required for uplink synchronization between the UE and the eNB in the secondary serving cell, and therefore, the UE can apply the timing advance in the secondary serving cell to perform uplink communication, thereby fulfilling the application requirement that the UE supports inter-band carrier aggregation. In addition, in this embodiment, a HARQ feedback retransmission mechanism may be introduced in the RAR receiving and sending process, which improves the reliability of the RAR transmission and reduces the delay possibly caused by the rise of the reliability of RAR transmission. For detailed analysis, reference may be made to the corresponding description in the embodiment corresponding to FIG. 1 or FIG. 2, and no repeated description is given here any further.

Figure 5:
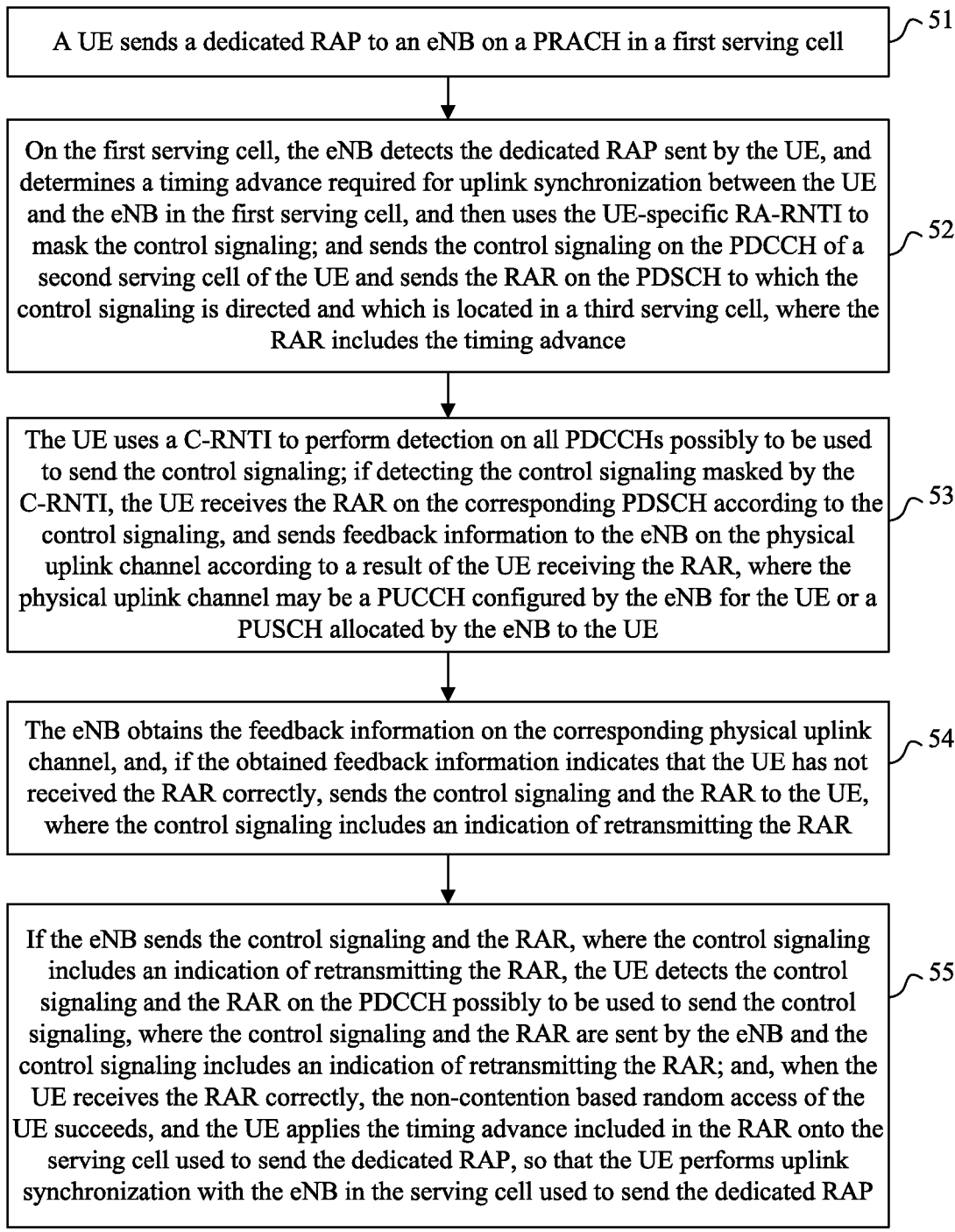
FIG. 5 is a flowchart of an RAR sending and receiving method according to Embodiment 4 of the present invention.

FIG. 5 is a flowchart of an RAR sending and receiving method according to Embodiment 4 of the present invention. Differences from the embodiment corresponding to FIG. 4 are: In this embodiment, the dedicated identifier used to mask or demask the control signaling is a UE-specific RA-RNTI configured by the eNB for the UE. As shown in FIG. 5, the method provided in this embodiment includes the following steps:

Step 51: Similar to step 41, and not repeated here any further.

Step 52: On the first serving cell, the eNB detects the dedicated RAP sent by the UE, and determines a timing advance required for uplink synchronization between the UE and the eNB in the first serving cell, and then uses the UE-specific RA-RNTI to mask the control signaling; and sends the control signaling on the PDCCH of a second serving cell of the UE and sends the RAR on the PDSCH to which the control signaling is directed and which is located in a third serving cell, where the RAR includes the timing advance.

In this step, the eNB uses a dedicated RA-RNTI rather than a C-RNTI to mask the control signaling, and other descriptions are similar to those in step 42 and are not repeated here any further.

Step 53 to step 55: Similar to step 43 to step 45, and not repeated here any further.

In the case where the control signaling is masked and demasked by using a dedicated RA-RNTI in this embodiment, if the UE detects the control signaling correctly but fails to receive the RAR correctly in the timing range of the random access response receiving timer, the UE detects the control signaling on the PDCCH according to the dedicated RA-RNTI, where the control signaling includes an indication of retransmitting the RAR; and, according to the control signaling that includes an indication of retransmitting the RAR, the UE receives the RAR on the corresponding PDSCH.

Limited by the processing capacity of the UE, the network side may enable or disable the cross scheduling (Cross Scheduling) function in the carrier aggregation application scenario, that is, use the control signaling sent on the PDCCH in one serving cell to schedule PUSCH uplink data transmission or PDSCH downlink data transmission of one or more other serving cells. Correspondingly, the serving cell where the PDCCH used by the UE to detect the control signaling initially sent by the network side is located may be the same as the serving cell where the PDCCH used by the UE to detect the control signaling retransmitted by the network side is located; and, if the network side enables a cross scheduling function for the UE, the serving cell where the PDCCH used by the UE to detect the control signaling initially sent by the network side is located may be different from the serving cell where the PDCCH used by the UE to detect the control signaling retransmitted by the network side is located. The serving cell where the PDSCH used by the UE to receive the RAR initially sent by the network side is located is the same as the serving cell where the PDSCH used by the UE to receive the RAR retransmitted by the network side is located, so that the UE can combine and receive the RARs that are sent by the network side repeatedly.

If the UE fails to detect the control signaling correctly upon timeout of the random access response receiving timer, the UE retransmits the dedicated RAP to the network side to trigger the entire non-contention based random access procedure again. If the UE has detected the control signaling correctly but fails to receive the RAR correctly upon timeout of the random access response receiving timer, the UE retransmits the dedicated RAP to the network side to trigger the entire non-contention based random access procedure again, or the UE may start a random access response retransmission receiving timer.

The random access response retransmission receiving timer is configured to limit time of the action of the UE for receiving the RAR retransmitted by the network side, and the random access response retransmission receiving timer may be the same as or different from the random access response receiving timer. The random access response retransmission receiving timer may be started for one time or multiple times (restarted). In practical application, a maximum number of times of restarting the random access response retransmission receiving timer may be preset, and the maximum number of times may be 1 time, 2 times or more.

Specifically, the dedicated random access preamble is retransmitted to the network side if the random access response is not received correctly upon timeout of the random access response retransmission receiving timer; or, the random access response retransmission receiving timer is restarted if the random access response is not received correctly upon timeout of the random access response retransmission receiving timer, and the dedicated random access preamble is retransmitted to the network side if the random access response is not received correctly when the number of times of timeout of the random access response retransmission receiving timer reaches the preset maximum number. Each timing duration of the random access response retransmission receiving timer and the maximum number of times that the timer is allowed to be restarted may be configured by the network side such as the eNB, and the eNB may notify the UE of configuration information corresponding to the random access response retransmission receiving timer by using a broadcast message or a dedicated RRC message or by other means.

If the UE still fails to receive the random access response correctly when the random access response retransmission receiving timer times out and the number of times of timeout reaches the preset maximum number, the UE retransmits the dedicated RAP to the network side to trigger the entire non-contention based random access procedure again; otherwise, the UE finishes the non-contention based random access procedure, and, in the subsequent uplink communication process, the UE may apply the timing advance carried in the RAR that is received correctly in the non-contention based random access procedure.

If the UE receives the RAR correctly in the process of getting ready for retransmitting the dedicated RAP to the network side, the UE terminates the retransmission of the RAP.

This embodiment can implement the technical effects similar to those in the embodiment corresponding to FIG. 4, but differs in that: Because the dedicated RA-RNTI is a new dedicated temporary identifier configured by the eNB for the UE for the purpose of non-contention based random access of the UE, if the UE detects the control signaling on the PDCCH and receives the RAR correctly, the UE does not need to continue to detect the control signaling on the PDCCH any longer, where the control signaling is masked by using the dedicated RA-RNTI. For the technical effects achievable by this embodiment and similar to the embodiment corresponding to FIG. 4, reference may be made to the corresponding description in the embodiment corresponding to FIG. 4, and no repeated description is given here any further.

Figure 6:
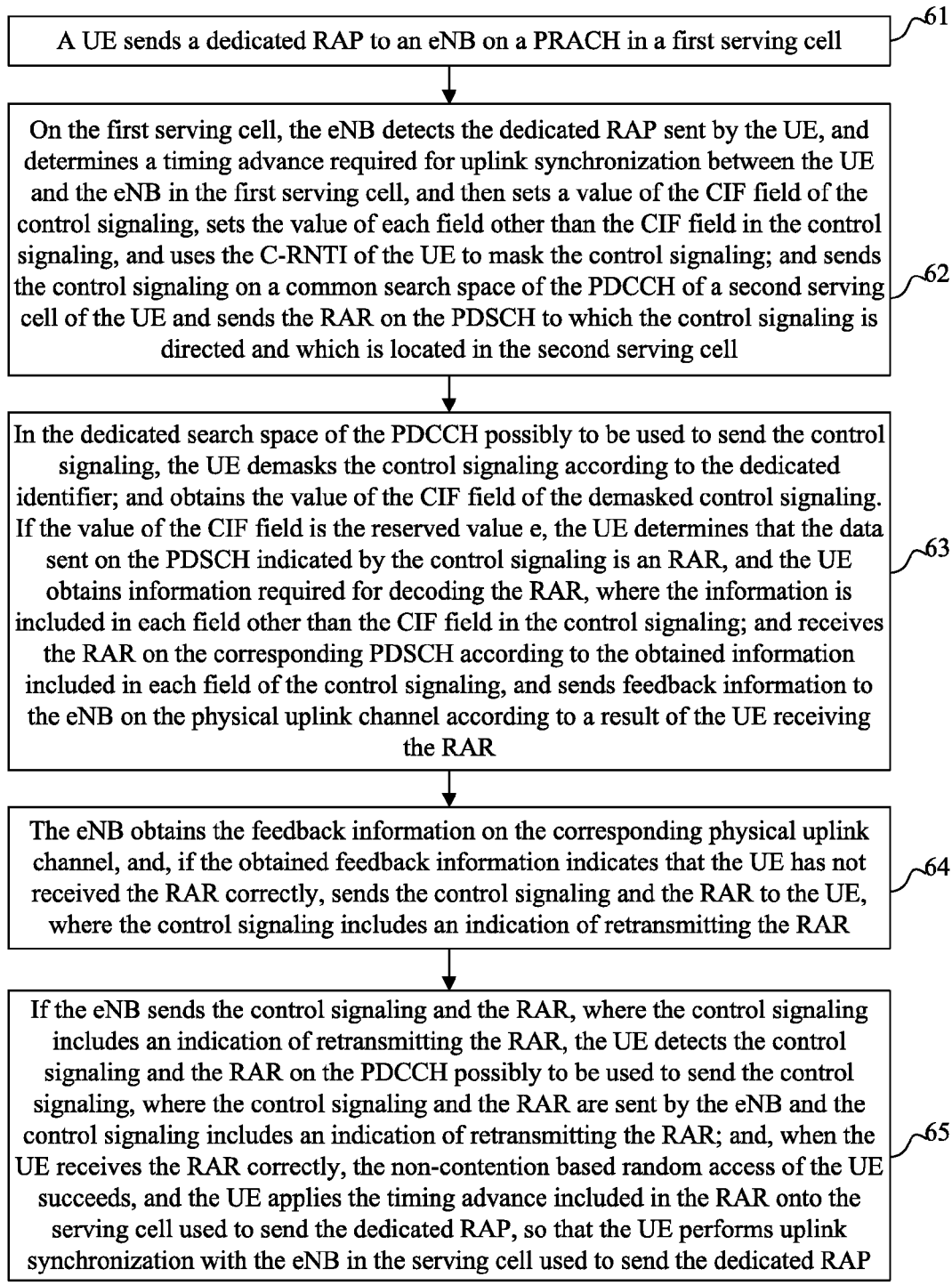
FIG. 6 is a flowchart of an RAR sending and receiving method according to Embodiment 5 of the present invention.

FIG. 6 is a flowchart of an RAR sending and receiving method according to Embodiment 5 of the present invention. Differences from the embodiment corresponding to FIG. 4 are: In this embodiment, the control signaling used to indicate RAR receiving and sending includes a carrier/cell indicator field (Carrier/Cell Indicator Field, CIF field for short), and the value of the CIF field is used to indicate that the data sent on the PDSCH indicated by the C-RNTI-masked control signaling is an RAR. Specifically, the method shown in FIG. 6 includes the following steps.

Step 61: A UE sends a dedicated RAP to an eNB on a PRACH in a first serving cell.

This step is similar to step 41, and not repeated here any further.

Step 62: On the first serving cell, the eNB detects the dedicated RAP sent by the UE, and determines a timing advance required for uplink synchronization between the UE and the eNB in the first serving cell, and then sets a value of the CIF field of the control signaling, sets the value of each field other than the CIF field in the control signaling, and uses the C-RNTI of the UE to mask the control signaling; and sends the control signaling on a common search space of the PDCCH of a second serving cell of the UE and sends the RAR on the PDSCH to which the control signaling is directed and which is located in the second serving cell.

The eNB sets the value of the CIF field of the control signaling, which is used to indicate that the data sent on the PDSCH indicated by the control signaling masked by using the C-RNTI is an RAR; and sets the value of each field other than the CIF field in the control signaling, which is used to indicate information required for decoding the RAR. The eNB uses the C-RNTI to mask the control signaling in which each field is set, and then sends the masked control signaling on a dedicated search space of the PDCCH of the second serving cell of the UE, and sends the RAR on the PDSCH of the second serving cell to which the control signaling is directed and which is located in the second serving cell, where the RAR includes at least the timing advance.

Different from ordinary control signaling, a cross scheduling command includes a CIF field. The CIF field has three bits, and its value range is 0 to 7, where 0 means that the PUSCH or PDSCH indicated by the control signaling is located in the primary serving cell, and 1 to 7 refer to the specific secondary serving cell where the PUSCH or PDSCH indicated by the control signaling is located. If the number of serving cells configured by the eNB for the UE is less than 8, the CIF field has idle values that are available. For example, if the eNB configures three serving cells for the UE, the values of the CIF field being 0, 1, and 2 are valid values, which are used to indicate the specific serving cell where the PUSCH or PDSCH indicated by the control signaling is located; and the values of the CIF field being 3, 4, 5, 6, and 7 are idle values. In the prior art, if the UE detects the control signaling whose values of the CIF field are 3, 4, 5, 6, and 7, it is deemed that the CIF field carries an invalid indication. In order to reuse the resources allocated in the CIF field in the prior art, in this embodiment, a specific value in the idle values of the CIF field, or any one value in the idle values of the CIF field, may be used as a reserved value. The reserved value is used to indicate that the data transmitted on the PDSCH indicated by the C-RNTI-masked control signaling is an RAR.

In the process of implementing the embodiment of the present invention, the inventor finds that after the UE-specific C-RNTI configured by the eNB for the UE is applied to the RAR receiving and sending process in non-contention based random access of the UE, the C-RNTI-masked control signaling may be ordinary scheduling signaling or control signaling provided in this embodiment to indicate receiving of the RAR. The UE needs to detect all C-RNTI-masked control signaling. After detecting the C-RNTI-masked control signaling, the UE can know that data destined for the UE exists on the PDSCH to which the control signaling is directed, but the UE does not know whether the data is an RAR until the data is received correctly on the corresponding PDSCH. If the UE uses the C-RNTI to detect the control signaling in the timing range of the RAR response receiving timer, and, according to the control signaling, the data received correctly on the PDSCH is not an RAR, then the UE cannot determine the reasons of failing to receive the RAR correctly.

For example, the reason may be reason 1. The dedicated RAP sent by the UE is lost, and the eNB has not received the dedicated RAP, and consequently, the eNB does not send the control signaling used to indicate the receiving or sending of the RAR at all, and therefore, the UE fail to receive the RAR correctly; or, the reason may be reason 2: The eNB has sent the control signaling used to indicate the receiving or sending of the RAR, but the RAR sent by the eNB is lost, which makes the UE fail to receive the RAR correctly, and so on. Depending on different reasons, the UE needs to take different measures to improve the reliability of receiving the RAR. For example, in the case of reason 1, the UE needs to retransmit the dedicated RAP to the eNB to trigger the entire non-random access procedure; and, in the case of reason 2, the UE needs to instruct the eNB to retransmit the RAR, and so on.

In an application scenario of being masked and demasked by the C-RNTI to indicate the control signaling, to facilitate the UE in determining the reason why the UE fails to receive the RAR correctly, in this embodiment, a value of a field in the control signaling may be used or a new field may be added in the control signaling to indicate whether the data sent on the PDSCH to which the current control signaling is directed is an RAR. Further, in order to reuse the resources allocated in the CIF field in the prior art, in this embodiment, any one value in the idle values of the CIF field may be used as a reserved value. The reserved value is used to indicate that the data transmitted on the PDSCH indicated by the control signaling is an RAR. Further, the reserved value may be further used to indicate by default that the PDSCH used to send the RAR and the PDCCH used to send the current control signaling are located in the same serving cell.

The eNB sets the value of the CIF field in the control signaling to be sent to the reserved value. In this way, according to a detection result indicating whether the CIF field of the demasked control signaling includes the reserved value, the UE can determine whether the data transmitted on the PDSCH indicated by the control signaling is an RAR.

On the network side, if the eNB enables a cross scheduling function, the existing cross scheduling command can be sent only in a dedicated search space of the UE, and cannot be sent in a common space. In other words, the control signaling sent in the common space can schedule only the uplink or downlink transmission of this serving cell.

To be compatible with the prior art, the eNB in this embodiment sends the control signaling on the dedicated search space of the PDCCH of the second serving cell of the UE, where an idle value is set in the CIF field in the control signaling and the control signaling is masked by using a dedicated identifier.

Step 63: In the dedicated search space of the PDCCH possibly to be used to send the control signaling, the UE demasks the control signaling according to the dedicated identifier; and obtains the value of the CIF field of the demasked control signaling. If the value of the CIF field is the reserved value, the UE determines that the data sent on the PDSCH indicated by the control signaling is an RAR, and the UE obtains information required for decoding the RAR, where the information is included in each field other than the CIF field in the control signaling; and receives the RAR on the corresponding PDSCH according to the obtained information included in each field of the control signaling, and sends feedback information to the eNB on the physical uplink channel according to a result of the UE receiving the RAR.

The physical uplink channel may be a PUCCH configured by the eNB for the UE, or a PUSCH allocated by the eNB to the UE.

After the dedicated random access preamble is sent and before the control signaling is detected, a random access response receiving timer may be started (that is, a random access response receiving window may be started); and step 61 may be performed if it is determined that the value of the CIF field is not the reserved value when the random access response receiving timer times out, that is, the UE retransmits the dedicated RAP to the eNB if the control signaling whose value of the CIF field is the reserved value is not detected correctly when the random access response receiving timer times out.

Step 64 to step 65: Similar to step 44 to step 45, and not repeated here any further.

In the case where the control signaling is masked and demasked by using a C-RNTI and the value CIF is a reserved value, if the UE correctly detects the control signaling whose value of the CIF field is the reserved value but fails to receive the random access response correctly when the random access response receiving timer times out, the UE may retransmit the dedicated RAP to the eNB; or, on the physical downlink control channel, the UE detects the control signaling according to the C-RNTI, where the control signaling includes an indication of retransmitting the RAR; and, according to the control signaling that includes an indication of retransmitting the RAR, the UE receives the retransmitted RAR on the corresponding physical downlink shared channel.

Optionally, the UE may further start a random access response retransmission receiving timer before detecting the control signaling that includes the indication of retransmitting the random access response; and, if the random access response is not received correctly when the random access response retransmission receiving timer times out, then the UE may retransmit the dedicated RAP to the eNB; or restart the random access response retransmission receiving timer, and retransmit the dedicated RAP to the eNB if the RAR is not received correctly when the number of times of timeout of the random access response retransmission receiving timer reaches a preset maximum number.

If the UE receives the RAR correctly in the process of getting ready for retransmitting the dedicated RAP to the network side, the UE terminates the retransmission of the RAP.

Definitely, another idle field or a newly added field in the control signaling may be used instead to indicate whether the data is an RAR message, which is not detailed here any further.

This embodiment can implement the technical effects similar to those in the embodiment corresponding to FIG. 4 or FIG. 5. In addition, in this embodiment, by using the idle value of the CIF field in the control signaling, according to a result of detecting the CIF field of the control signaling, the UE can determine whether the data transmitted on the PDCCH indicated by the control signaling is an RAR, and therefore, the UE can conveniently determine the reason for failure of receiving the RAR correctly when the UE detects the control signaling by using the C-RNTI but fails to receive the RAR correctly, and the UE can take measures corresponding to the reason to improve the reliability of receiving the RAR.

Figure 7:
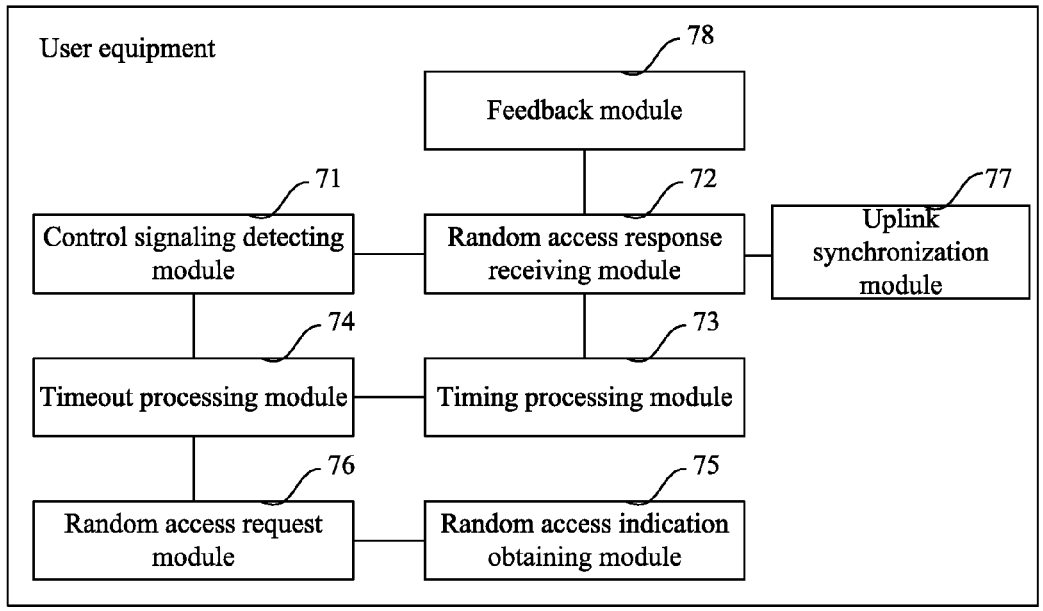
FIG. 7 is a schematic structural diagram of a user equipment according to Embodiment 6 of the present invention.

FIG. 7 is a schematic structural diagram of a user equipment according to Embodiment 6 of the present invention. The user equipment shown in FIG. 7 includes a control signaling detecting module 71 and a random access response receiving module 72.

The control signaling detecting module 71 may be configured to: after a dedicated random access preamble is sent to a network side, on a physical downlink control channel, according to a pre-obtained dedicated identifier, detect control signaling masked by using the dedicated identifier, where the dedicated identifier is a user equipment-specific temporary identifier configured by the network side for the user equipment, and the control signaling includes information about a physical downlink shared channel used to send a random access response and information required for decoding the random access response.

The random access response receiving module 72 may be configured to receive the random access response on a corresponding physical downlink shared channel according to the control signaling.

Optionally, the dedicated identifier includes a C-RNTI or a dedicated RA-RNTI configured by the network side for the user equipment.

If the dedicated identifier includes a C-RNTI, the control signaling detecting module 71 may be further configured to check a value of a carrier/cell indicator field of the control signaling demasked according to the cell radio network temporary identifier, and, if the value of the carrier/cell indicator field is a reserved value, determine that data sent on a physical downlink shared channel to which the control signaling is directed is the random access response, where the reserved value is an idle value of the carrier/cell indicator field.

Optionally, the user equipment may further include a random access indication obtaining module 75 and a random access request module 76. The random access indication obtaining module 75 may be configured to: receive random access indication information, where the random access indication information includes the dedicated random access preamble, a physical random access channel used to send the dedicated random access preamble, and a serving cell where the physical random access channel is located; and the serving cell where the physical random access channel used to send the dedicated random access preamble is located is a single serving cell configured by the network side for the user equipment, or a primary serving cell or any one secondary serving cell among multiple serving cells configured by the network side for the user equipment. The random access request module 76 may be configured to send the dedicated random access preamble to the network side, which specifically is: sending the dedicated random access preamble to the network side on a corresponding physical random access channel according to the random access indication information.

Further, the random access response may include a timing advance required for uplink synchronization between the user equipment and the network side; and the user equipment may further include an uplink synchronization module 77. The uplink synchronization module 77 may be configured to: if the physical random access channel used to send the dedicated random access preamble is located in any one secondary serving cell among multiple serving cells configured by the network side for the user equipment, apply the timing advance onto an uplink channel that needs to perform communication in the any one secondary serving cell, so that the user equipment performs uplink synchronization with the network side in the any one secondary serving cell.

Optionally, the user equipment may further include a feedback module 78. The feedback module 78 may be configured to: according to a result of receiving the random access response, send feedback information to the network side on a physical uplink channel at preset time of sending the feedback information, where the physical uplink channel is a physical uplink control channel configured for the user equipment or a physical uplink shared channel allocated to the user equipment.

In the foregoing technical solution, if the channel used to send the dedicated random access preamble is located in a secondary serving cell among multiple serving cells configured for the user equipment, the physical uplink channel may include a physical uplink control channel of a primary serving cell among the multiple serving cells configured for the user equipment, or the physical uplink channel includes a physical uplink shared channel of the primary serving cell among the multiple serving cells allocated to the user equipment, or the physical uplink channel may include a physical uplink shared channel of a secondary serving cell among the multiple serving cells allocated to the user equipment. Alternatively, if the channel used to send the dedicated random access preamble is located in a single serving cell configured for the user equipment or a primary serving cell among multiple serving cells configured for the user equipment, the physical uplink channel may be a physical uplink control channel configured for the user equipment for a purpose of feedback.

If the UE is in an uplink synchronization state in a serving cell where the physical uplink channel is located, the preset time of sending the feedback information is a fourth subframe after the control signaling is detected, and the feedback information includes ACK information or NACK information. Alternatively, if the UE is in an uplink synchronization loss state in the serving cell where the physical uplink channel is located and the RAR is received correctly, the preset time of sending the feedback information is a sixth subframe after the control signaling is detected, and is time after the timing advance is applied onto the physical uplink channel, and the feedback information includes the ACK information.

Further, the user equipment may further include a timing processing module 73 and a timeout processing module 74.

In a first scenario where the control signaling is masked and demasked by using a C-RNTI and the control signaling includes no CIF field or includes a CIF field whose CIF field value is not the reserved value, the timing processing module 73 may be configured to start a random access response receiving timer after sending the dedicated random access preamble and before detecting the control signaling; and the timeout processing module 74 may be configured to send the dedicated random access preamble to the network side if the control signaling masked by using the C-RNTI is not detected correctly upon timeout of the random access response receiving timer.

In a second scenario where the control signaling is masked and demasked by using a dedicated RA-RNTI, the timing processing module 73 may be configured to start a random access response receiving timer after sending the dedicated random access preamble and before detecting the control signaling; and the timeout processing module 74 may be configured to retransmit the dedicated random access preamble to the network side if the control signaling is not detected correctly upon timeout of the random access response receiving timer.

In a third scenario where the control signaling is masked and demasked by using a C-RNTI and the control signaling includes a CIF field and the value of the CIF field is the reserved value, the timing processing module 73 may be configured to start a random access response receiving timer after sending the dedicated random access preamble and before detecting the control signaling; and the timeout processing module 74 may be configured to retransmit the dedicated random access preamble to the network side if the control signaling whose CIF field value is the reserved value is not detected correctly upon timeout of the random access response receiving timer.

In the second scenario or the third scenario, the timeout processing module 74 may be further configured to: retransmit the dedicated random access preamble to the network side if the control signaling is detected correctly or the control signaling whose carrier/cell indicator field value is a reserved value is detected correctly upon timeout of the random access response receiving timer but the random access response is not received correctly; or, trigger the control signaling detecting module to detect the control signaling that includes an indication of retransmitting the random access response according to the dedicated identifier, and trigger the random access response receiving module to receive the retransmitted random access response on a corresponding physical downlink shared channel according to the control signaling that includes the indication of retransmitting the random access response.

Further, in the second scenario or the third scenario, the timing processing module 73 may be further configured to start a random access response retransmission receiving timer before detecting the control signaling that includes the indication of retransmitting the random access response. The timeout processing module 74 may be further configured to retransmit the dedicated random access preamble to the network side if the random access response is not received correctly upon timeout of the random access response retransmission receiving timer; or, trigger the timing processing module to restart the random access response retransmission receiving timer, and retransmit the dedicated random access preamble to the network side if the random access response is not received correctly when the number of times of timeout of the random access response retransmission receiving timer reaches a preset maximum number.

In this embodiment, a UE uses a dedicated identifier to demask control signaling that is masked by the dedicated identifier and used to indicate receiving of an RAR, and therefore, according to a detection result of the control signaling, the UE can determine whether the current control signaling is sent by a network side to the user equipment, and receives the RAR according to the control signaling only if the control signaling is detected correctly, thereby reducing the complexity for the UE to receive the RAR and reducing the probability of the UE applying incorrectly the timing advance carried in the RAR.

In addition, the UE in this embodiment can perform non-contention based random access in any one secondary serving cell to obtain the timing advance corresponding to the secondary serving cell, and therefore, the UE can apply the timing advance corresponding to the secondary serving cell in the secondary serving cell in an application scenario where the UE needs to support inter-band carrier aggregation, so that the UE performs uplink synchronization with the network side in the secondary serving cell.

Further, in this embodiment, an RAR retransmission mechanism is introduced in the non-contention based random access procedure, which improves the reliability of RAR retransmission and helps reduce resource overhead required for random access of the UE. For the specific working principles of the UE in this embodiment, reference may be made to the corresponding descriptions about the UE in the embodiments corresponding to FIG. 1 to FIG. 6, and no repeated description is given here any further.

Figure 8:
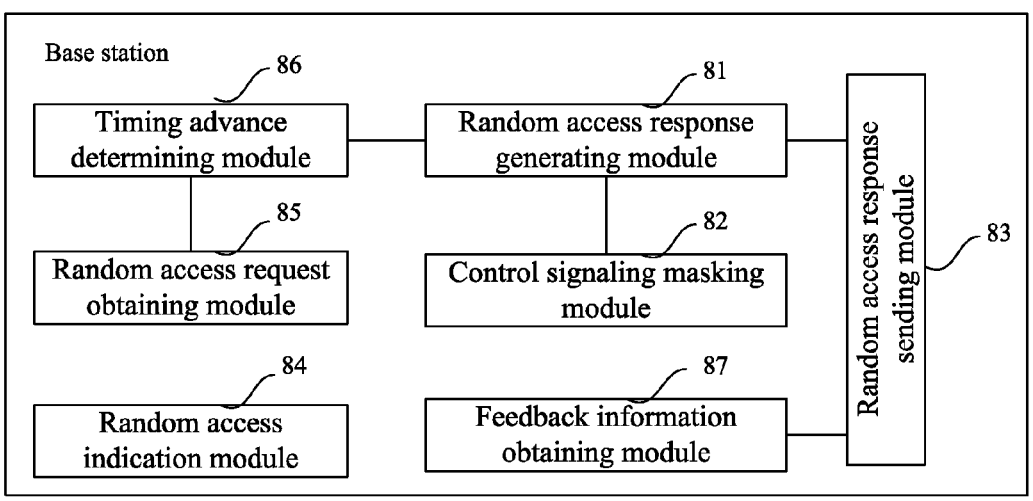
FIG. 8 is a schematic structural diagram of a base station according to Embodiment 7 of the present invention.

FIG. 8 is a schematic structural diagram of a base station according to Embodiment 7 of the present invention. The base station shown in FIG. 8 includes a random access response generating module 81, a control signaling masking module 82, and a random access response sending module 83.

The random access response generating module 81 may be configured to generate a random access response after receiving a dedicated random access preamble sent by a user equipment.

The control signaling masking module 82 may be configured to mask control signaling according to a dedicated identifier, where the dedicated identifier is a user equipment-specific temporary identifier configured by a network side for the user equipment, and the control signaling includes information about a physical downlink shared channel used to send a random access response and information required for decoding the random access response.

The random access response sending module 83 may be configured to send the masked control signaling on a physical downlink control channel, and send the random access response on a corresponding physical downlink shared channel according to the control signaling.

Optionally, the dedicated identifier includes a C-RNTI or a dedicated RA-RNTI configured for the user equipment.

Optionally, the control signaling masking module 82 may be further configured to: before the control signaling is masked according to the cell radio network temporary identifier, set a value of a carrier/cell indicator field of the control signaling to a reserved value, where the reserved value is an idle value of the carrier/cell indicator field and is used to indicate that data sent on a physical downlink shared channel to which the control signaling is directed is the random access response. In this case, the physical downlink control channel used to send the control signaling is located in a single serving cell of the user equipment or any one serving cell among multiple serving cells, and the sent control signaling is located in a private search space of the physical downlink control channel used to send the control signaling.

Optionally, the base station may further include a random access indication module 84, a random access request obtaining module 85, and a timing advance determining module 86. The random access indication module 84 may be configured to: send random access indication information to the user equipment, where the random access indication information includes the dedicated random access preamble, a physical random access channel used to send the dedicated random access preamble, and a serving cell where the physical random access channel is located; and the serving cell where the physical random access channel used to send the dedicated random access preamble is located is a single serving cell configured for the user equipment, or a primary serving cell or any one secondary serving cell among multiple serving cells configured for the user equipment. The random access request obtaining module 85 may be configured to, on a physical random access channel to which the random access indication information is directed, receive the dedicated random access preamble sent by the user equipment. The timing advance determining module 86 may be configured to determine a timing advance required for uplink synchronization between the user equipment and the network side in a serving cell where the physical random access channel is located, where the random access response includes the timing advance.

In the foregoing technical solution, the physical downlink control channel used to send the control signaling, the physical downlink shared channel used to send the random access response, and the channel used to receive the dedicated random access preamble are respectively located in different serving cells configured for the user equipment, or, at least any two of the physical downlink control channel used to send the control signaling, the physical downlink shared channel used to send the random access response, and the channel used to receive the dedicated random access preamble are located in the same serving cell configured for the user equipment.

Optionally, the base station may further include a feedback information obtaining module 87. The feedback information obtaining module 87 may be configured to receive feedback information on a physical uplink channel at preset time of sending the feedback information, where the feedback information is sent by the user equipment according to a result of receiving the random access response; and the physical uplink channel is a physical uplink control channel configured for the user equipment or a physical uplink shared channel allocated to the user equipment.

In the foregoing technical solution, if the channel used to receive the dedicated random access preamble is located in a secondary serving cell among multiple serving cells configured for the user equipment, the physical uplink channel may include a physical uplink control channel of a primary serving cell among the multiple serving cells configured for the user equipment, or the physical uplink channel may include a physical uplink shared channel of the primary serving cell among the multiple serving cells allocated to the user equipment, or the physical uplink channel may include a physical uplink shared channel of a secondary serving cell among the multiple serving cells allocated to the user equipment. Alternatively, if the channel used to receive the dedicated random access preamble is located in a single serving cell configured for the user equipment or a primary serving cell among multiple serving cells configured for the user equipment, the physical uplink channel may specifically be a physical uplink control channel configured for the user equipment for a purpose of feedback.

If the user equipment is in an uplink synchronization state in a serving cell that includes the physical uplink channel, the preset time of receiving the feedback information may specifically be a fourth subframe after the control signaling is sent; or, if the user equipment is in an uplink synchronization loss state in a serving cell that includes the physical uplink channel, the preset time of receiving the feedback information may specifically be a sixth subframe after the control signaling is sent, and is time after the timing advance is applied onto the physical uplink channel.

Further, the random access response sending module 83 may be further configured to: if the feedback information that includes the ACK information is not received at the preset time of receiving the feedback information, on the physical downlink control channel, send the control signaling that includes an indication of retransmitting the random access response; and, according to the control signaling that includes the indication of retransmitting the random access response, retransmit the random access response on a corresponding physical downlink shared channel. The serving cell that includes the physical downlink control channel used to initially send the control signaling is the same as or different from the serving cell that includes the physical downlink control channel used to retransmit the control signaling.

In this embodiment, a UE-specific identifier configured for the UE is used to mask the control signaling that is sent by the base station to the UE and used to indicate receiving of an RAR, and therefore, according to a detection result of the control signaling, the UE can determine whether the current control signaling is sent by the network side to the UE, and receives the RAR according to the control signaling only if the control signaling is detected correctly, thereby reducing the complexity for the UE to receive the RAR and preventing the UE from incorrectly applying the timing advance carried in the RAR. In addition, the base station in this embodiment may instruct the UE to perform non-contention based random access in any one secondary serving cell of the UE, and indicate the timing advance to be applied by the UE in the secondary serving cell, and therefore, the UE can apply the timing advance corresponding to the secondary serving cell in the secondary serving cell in an application scenario where the UE needs to support inter-band carrier aggregation, so that the UE performs uplink synchronization with the network side in the secondary serving cell. Further, in this embodiment, an RAR retransmission mechanism is introduced in the non-contention based random access procedure, which improves the reliability of RAR retransmission and helps reduce resource overhead required for random access of the UE. For the working principles of the base station in this embodiment, reference may be made to the corresponding description about the network side or the eNB in the embodiments corresponding to FIG. 1 to FIG. 6, and no repeated description is given here any further.

Figure 9:
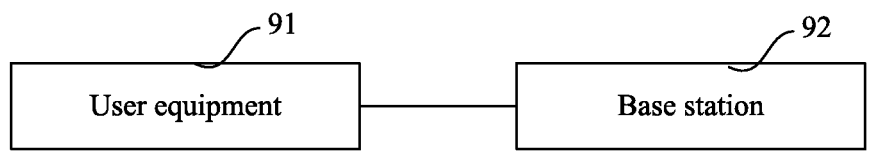
FIG. 9 is a schematic structural diagram of a communication system according to Embodiment 8 of the present invention.

FIG. 9 is a schematic structural diagram of a communication system according to Embodiment 8 of the present invention. As shown in FIG. 9, the communication system provided in this embodiment includes a user equipment 91 and a base station 92, where the user equipment 91 is in communicative connection with the base station 92. For the specific structure of the user equipment, reference may be made to the description in the embodiment shown in FIG. 7; for the specific structure of the base station, reference may be made to the description in the embodiment shown in FIG. 7; and, for the principles of sending and receiving the random access response through interaction between the user equipment and the base station, and achievable technical effects, reference may be made to the descriptions in the embodiments shown in FIG. 1 to FIG. 6, and no repeated description is given here any further.

Persons of ordinary skill in the art may understand that an accompanying drawing herein is only a schematic diagram of an embodiment, and the modules or processes in the drawing are not necessarily required for implementing the present invention.

Persons of ordinary skill in the art may understand that modules in an apparatus in an embodiment of the present invention may be distributed in the apparatus in the manner described herein, or otherwise located in one or more apparatuses different from what is described herein. The modules in the embodiment may combine into one module, or split into multiple submodules.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments, or make equivalent replacements to some technical features thereof, as long as the modifications and replacements do not cause the essence of corresponding technical solutions to depart from the spirit and scope of the technical solutions of the embodiments of the present invention.

What is claimed is:

1. A random access response receiving method, comprising:
receiving random access indication information, wherein the random access indication information comprises a dedicated random access preamble, a physical random access channel to be used to send the dedicated random access preamble, and a serving cell where the physical random access channel is located;
sending the dedicated random access preamble to a network side on a corresponding physical random access channel according to the random access indication information;
detecting control signaling masked on a physical downlink control channel, the control signaling being detected using a pre-obtained dedicated identifier, wherein the dedicated identifier is a user equipment-specific temporary identifier configured by the network side for the user equipment and wherein the control signaling comprises information about a physical downlink shared channel used to send a random access response and information required for decoding the random access response;
starting a random access response receiving timer after sending the dedicated random access preamble;
retransmitting the dedicated random access preamble to the network side in response to the control signaling not being detected correctly or the control signaling whose value of a carrier/cell indicator field is a reserved value not being detected correctly before timeout of the random access response receiving timer; and
receiving the random access response on a corresponding physical downlink shared channel according to the control signaling.

2. The method according to claim 1, wherein the dedicated identifier comprises a cell radio network temporary identifier.

3. The method according to claim 2, further comprising:
starting a random access response receiving timer after sending the dedicated random access preamble and before detecting the control signaling; and sending the dedicated random access preamble to the network side if the control signaling is not detected correctly upon timeout of the random access response receiving timer.

4. The method according to claim 2, further comprising: checking a value of the carrier/cell indicator field of the control signaling demasked according to the cell radio network temporary identifier, wherein the value of the carrier/cell indicator field is a reserved value; and determining that data sent on a physical downlink shared channel to which the control signaling is directed is the random access response, where the reserved value is an idle value of the carrier/cell indicator field.

5. The method according to claim 4, wherein, if the control signaling is detected correctly or the control signaling whose value of the carrier/cell indicator field is a reserved value is detected correctly upon timeout of the random access response receiving timer but the random access response is not received correctly, retransmitting the dedicated random access preamble to the network side; or on the physical downlink control channel, according to the dedicated identifier, detecting the control signaling that comprises an indication of retransmitting the random access response; and, according to the control signaling that comprises the indication of retransmitting the random access response, receiving the retransmitted random access response on a corresponding physical downlink shared channel.

6. The method according to claim 5, further comprising: starting a random access response retransmission receiving timer before detecting the control signaling that comprises the indication of retransmitting the random access response; and if the random access response is not received correctly upon timeout of the random access response retransmission receiving timer, retransmitting the dedicated random access preamble to the network side, or restarting the random access response retransmission receiving timer, and retransmitting the dedicated random access preamble to the network side if the random access response is not received correctly when the number of times of timeout of the random access response retransmission receiving timer reaches a preset maximum number.

7. The method according to claim 1, wherein the dedicated identifier comprises a dedicated random access radio network temporary identifier configured by the network side for the user equipment.

8. The method according to claim 1, wherein the serving cell where the physical random access channel used to send the dedicated random access preamble is located is one of a single serving cell configured by the network side for the user equipment, or a primary serving cell or any one secondary serving cell among multiple serving cells configured by the network side for the user equipment.

9. The method according to claim 1, wherein:

the random access response comprises a timing advance required for uplink synchronization between the user equipment and the network side;

a physical random access channel used to send the dedicated random access preamble is located in any one secondary serving cell among multiple serving cells configured by the network side for the user equipment; and the method further comprises applying the timing advance onto an uplink channel that needs to perform communication in the any one secondary serving cell, so that the user equipment performs uplink synchronization with the network side in the any one secondary serving cell.

10. The method according to claim 1, wherein, after the receiving the random access response on a corresponding physical downlink shared channel, the method further comprises, according to a result of receiving the random access response, sending feedback information to the network side on a physical uplink channel at preset time of sending the feedback information, wherein the physical uplink channel is a physical uplink control channel configured for the user equipment or a physical uplink shared channel allocated to the user equipment.

11. The method according to claim 10, wherein:

when the channel used to send the dedicated random access preamble is located in a secondary serving cell among multiple serving cells configured for the user equipment, the physical uplink channel comprises a physical uplink control channel of a primary serving cell among the multiple serving cells configured for the user equipment, or the physical uplink channel comprises a physical uplink shared channel of the primary serving cell among the multiple serving cells allocated to the user equipment, or the physical uplink channel comprises a physical uplink shared channel of a secondary serving cell among the multiple serving cells allocated to the user equipment; and when the channel used to send the dedicated random access preamble is located in a single serving cell configured for the user equipment or a primary serving cell among multiple serving cells configured for the user equipment, the physical uplink channel is a physical uplink control channel configured for the user equipment for a purpose of feedback.

12. The method according to claim 10, wherein:

when the user equipment is in an uplink synchronization state in a serving cell where the physical uplink channel is located, the preset time of sending the feedback information is a fourth subframe after the control signaling is detected, wherein the feedback information comprises ACK information or NACK information; and when the user equipment is in an uplink synchronization loss state in the serving cell where the physical uplink channel is located and the random access response is received correctly, the preset time of sending the feedback information is a sixth subframe after the control signaling is detected, and is time after a timing advance is applied onto the physical uplink channel, wherein the feedback information comprises the ACK information.

13. A random access response sending method, comprising:

sending random access indication information to a user equipment, wherein the random access indication information comprises a dedicated random access preamble, a physical random access channel used to send the dedicated random access preamble, and a serving cell where the physical random access channel is located, wherein the serving cell where the physical random access channel used to send the dedicated random access preamble is located is a single serving cell configured for the user equipment, or a primary serving cell or any one secondary serving cell among multiple serving cells configured for the user equipment;

determining a timing advance required for uplink synchronization between the user equipment and a network side in a serving cell where the physical random access channel is located;

generating a random access response after receiving the dedicated random access preamble sent by the user equipment according to the random access indication information and on a physical random access channel to which the random access indication information is directed, wherein the random access response comprises the timing advance;

masking control signaling according to a dedicated identifier, wherein the dedicated identifier is a user equipment-specific temporary identifier configured by the network side for the user equipment and wherein the control signaling comprises information about a physical downlink shared channel used to send a random access response and information required for decoding the random access response;

sending the masked control signaling on a physical downlink control channel; and sending the random access response on a corresponding physical downlink shared channel according to the control signaling.

14. The method according to claim 13, wherein the dedicated identifier comprises a cell radio network temporary identifier or a dedicated random access radio network temporary identifier configured by the network side for the user equipment.

15. The method according to claim 14, wherein:
before the masking the control signaling according to the cell radio network temporary identifier, the method further comprises setting a value of a carrier/cell indicator field of the control signaling to a reserved value;
the reserved value is an idle value of the carrier/cell indicator field and is used to indicate that data sent on a physical downlink shared channel to which the control signaling is directed is the random access response;
the physical downlink control channel used to send the control signaling is located in a single serving cell of the user equipment or any one serving cell among multiple serving cells; and
the sent control signaling is located in a dedicated search space of the physical downlink control channel used to send the control signaling.

16. The method according to claim 13, wherein:
the physical downlink control channel used to send the control signaling, the physical downlink shared channel used to send the random access response, and the channel used to receive the dedicated random access preamble are respectively located in different serving cells configured for the user equipment; or
at least any two of the physical downlink control channel used to send the control signaling, the physical downlink shared channel used to send the random access response, and the channel used to receive the dedicated random access preamble are located in the same serving cell configured for the user equipment.

17. The method according to claim 13, wherein, after sending the control signaling and the random access response, the method further comprises receiving feedback information on a physical uplink channel at preset time of sending the feedback information, wherein the feedback information is sent by the user equipment according to a result of receiving the random access response, and wherein the physical uplink channel is a physical uplink control channel configured for the user equipment or a physical uplink shared channel allocated to the user equipment.

18. The method according to claim 17, wherein:
when the channel used to receive the dedicated random access preamble is located in a secondary serving cell among multiple serving cells configured for the user equipment, the physical uplink channel comprises a physical uplink control channel of a primary serving cell among the multiple serving cells configured for the user equipment, or the physical uplink channel comprises a physical uplink shared channel of the primary serving cell among the multiple serving cells allocated to the user equipment, or the physical uplink channel comprises a physical uplink shared channel of a secondary serving cell among the multiple serving cells allocated to the user equipment; and
when the channel used to receive the dedicated random access preamble is located in a single serving cell configured for the user equipment or a primary serving cell among multiple serving cells configured for the user equipment, the physical uplink channel is a physical uplink control channel configured for the user equipment for a purpose of feedback.

19. The method according to claim 17, wherein:
when the user equipment is in an uplink synchronization state in a serving cell where the physical uplink channel is located, the preset time of receiving the feedback information is a fourth subframe after the control signaling is sent; and
when the user equipment is in an uplink synchronization loss state in a serving cell where the physical uplink channel is located, the preset time of receiving the feedback information is a sixth subframe after the control signaling is sent, and is time after a timing advance is applied onto the physical uplink channel.

20. The method according to claim 17, further comprising, if feedback information that comprises ACK information is not received at the preset time of receiving the feedback information, on the physical downlink control channel, sending the control signaling that comprises an indication of retransmitting the random access response; and, according to the control signaling that comprises the indication of retransmitting the random access response, retransmitting the random access response on a corresponding physical downlink shared channel.

21. A user equipment, comprising:
a processor;
a non-transitory computer-readable storage medium storing a program to be executed by the processor, the program including instructions that cause the processor to:
receive random access indication information, wherein the random access indication information comprises a dedicated random access preamble, a physical random access channel to be used to send the dedicated random access preamble, and a serving cell where the physical random access channel is located;
send the dedicated random access preamble to a network side on a corresponding physical random access channel according to the random access indication information;
detect control signaling masked by using a pre-obtained dedicated identifier after sending the dedicated random access preamble, wherein the dedicated identifier is a user equipment-specific temporary identifier configured by the network side for the user equipment, and the control signaling comprises information about a physical downlink shared channel used to send a random access response and information required for decoding the random access response;

start a random access response receiving timer after sending the dedicated random access preamble and before detecting the control signaling; and retransmit the dedicated random access preamble to the network side if the control signaling is not detected correctly or the control signaling whose value of a carrier/cell indicator field is a reserved value is not detected correctly upon timeout of the random access response receiving timer; and receive the random access response on a corresponding physical downlink shared channel according to the control signaling.

22. The user equipment according to claim 21, wherein the dedicated identifier comprises a cell radio network temporary identifier.

23. The user equipment according to claim 22, wherein the program further includes instructions that cause the processor to:

start a random access response receiving timer after sending the dedicated random access preamble and before detecting the control signaling; and send the dedicated random access preamble to the network side if the control signaling is not detected correctly upon timeout of the random access response receiving timer.

24. The user equipment according to claim 22, wherein the instructions that cause the processor to detect control signaling include instructions that cause the processor to check a value of the carrier/cell indicator field of the control signaling demasked according to the cell radio network temporary identifier, and, if the value of the carrier/cell indicator field is a reserved value, determine that data sent on a physical downlink shared channel to which the control signaling is directed is the random access response, wherein the reserved value is an idle value of the carrier/cell indicator field.

25. The user equipment according to claim 24, wherein the instructions that cause the processor to retransmit the dedicated random access preamble to the network side include instructions that cause the processor to:

retransmit the dedicated random access preamble to the network side if the control signaling is detected correctly or the control signaling whose value of the carrier/cell indicator field is a reserved value is detected correctly upon timeout of the random access response receiving timer but the random access response is not received correctly, or trigger the instructions causing the processor to detect the control signaling to detect the control signaling that comprises an indication of retransmitting the random access response according to the dedicated identifier, and trigger the random access response receiving module to receive the retransmitted random access response on a corresponding physical downlink shared channel according to the control signaling that comprises the indication of retransmitting the random access response.

26. The user equipment according to claim 21, wherein the dedicated identifier comprises a dedicated random access radio network temporary identifier configured for the user equipment.

27. The user equipment according to claim 21, wherein the program further includes instructions that cause the processor to send, according to a result of receiving the random access response, feedback information to the network side on a physical uplink channel at preset time of sending the feedback information, wherein the physical uplink channel is a physical uplink control channel configured for the user equipment or a physical uplink shared channel allocated to the user equipment.

28. A base station, comprising:
a processor;
a non-transitory computer-readable storage medium storing a program to be executed by the processor, the program including instructions that cause the processor to:

send random access indication information to a user equipment, wherein the random access indication information comprises a dedicated random access preamble, a physical random access channel used to send the dedicated random access preamble, and a serving cell where the physical random access channel is located;

generate a random access response after receiving a dedicated random access preamble sent by the user equipment according to the random access indication information and on a physical random access channel to which the random access indication information is directed;

set a value of a carrier/cell indicator field of control signaling to a reserved value, wherein the reserved value is an idle value of the carrier/cell indicator field and is used to indicate that data sent on a physical downlink shared channel to which the control signaling is directed is the random access response;

mask the control signaling after setting the value of the carrier/cell indicator field of the control signaling to the reserved value and according to a dedicated identifier, wherein the dedicated identifier is a user equipment-specific temporary identifier configured by a network side for the user equipment, and the control signaling comprises information about a physical downlink shared channel used to send a random access response and information required for decoding the random access response; and send the masked control signaling on a physical downlink control channel, and send the random access response on a corresponding physical downlink shared channel according to the control signaling, wherein the physical downlink control channel on which the control signaling is sent is located in a single serving cell of the user equipment or any one serving cell among multiple serving cells, and the sent control signaling is located in a dedicated search space of the physical downlink control channel used to send the control signaling.

29. The base station according to claim 28, wherein the dedicated identifier comprises a cell radio network temporary identifier or a dedicated random access radio network temporary identifier configured by the network side for the user equipment.

30. The base station according to claim 28, wherein the program further includes instructions that cause the processor to:

receive feedback information on a physical uplink channel at preset time of sending the feedback information, wherein the feedback information is sent by the user equipment according to a result of receiving the random access response; and the physical uplink channel is a physical uplink control channel configured for the user equipment or a physical uplink shared channel allocated to the user equipment.

\* \* \* \* \*